United States Patent
Kocak et al.

(10) Patent No.: US 12,458,730 B2
(45) Date of Patent: Nov. 4, 2025

(54) PRE-SHAPED ALLOGRAFT IMPLANT FOR RECONSTRUCTIVE SURGICAL USE AND METHODS OF MANUFACTURE AND USE, AND TOOLS FOR FORMING A PRE-SHAPED ALLOGRAFT IMPLANT FOR RECONSTRUCTIVE SURGICAL USE

(71) Applicant: ALLOSOURCE, Centennial, CO (US)

(72) Inventors: Ergun Kocak, Gahanna, OH (US); Lauren Castillo, Highlands Ranch, CO (US); Jeffrey Chiesa, Denver, CO (US); Kenneth Blood, Littleton, CO (US); Reginald Stilwell, Parker, CO (US)

(73) Assignee: Allosource, Centennial, CO (US)

( * ) Notice: Subject to any disclaimer, the term of this patent is extended or adjusted under 35 U.S.C. 154(b) by 496 days.

(21) Appl. No.: 18/095,910

(22) Filed: Jan. 11, 2023

(65) Prior Publication Data

US 2023/0145585 A1    May 11, 2023

Related U.S. Application Data

(63) Continuation of application No. 17/899,270, filed on Aug. 30, 2022, which is a continuation-in-part of application No. 16/707,681, filed on Dec. 9, 2019.

(Continued)

(51) Int. Cl.
*A61F 2/12* (2006.01)
*A61F 2/00* (2006.01)
(Continued)

(52) U.S. Cl.
CPC ........ *A61L 27/3691* (2013.01); *A61F 2/0095* (2013.01); *A61F 2/12* (2013.01);
(Continued)

(58) Field of Classification Search
CPC ............... A61L 27/3691; A61L 27/362; A61L 2300/404; A61L 2430/04; A61L 2430/40;
(Continued)

(56) References Cited

U.S. PATENT DOCUMENTS

| 3,609,864 A | 10/1971 | Bassett |
| 4,627,429 A | 12/1986 | Tsuk |

(Continued)

FOREIGN PATENT DOCUMENTS

| AU | 2010276354 | 10/2014 |
| AU | 201911154 | 4/2019 |

(Continued)

OTHER PUBLICATIONS

International Search Report and Written Opinion for Int. Appl. No. PCT/US22/42058, Dec. 30, 2022, 9 pp.

(Continued)

*Primary Examiner* — Suzette J Gherbi
(74) *Attorney, Agent, or Firm* — James A. Sheridan; Sheridan Law, LLC

(57) ABSTRACT

There is disclosed an acellular dermal matrix (ADM) graft stored as a packaged ADM graft pocket product prepared by a process that includes providing a portion of ADM tissue having a thickness between 1 mm and 2 mm. The process includes scoring the portion of the ADM tissue into a pre-defined shape to form the domed shape ADM graft. The process includes verifying the thickness of the domed shape ADM graft; shaping the domed shape ADM graft to form an ADM graft pocket configured to receive a breast implant. The process includes packaging the ADM graft pocket to form a packaged ADM graft pocket. The process includes irradiating the packaged ADM graft pocket to a sterility assurance level of a desired level to form the packaged ADM graft pocket product. Other embodiments are also disclosed.

19 Claims, 16 Drawing Sheets

Related U.S. Application Data

(60) Provisional application No. 63/238,733, filed on Aug. 30, 2021, provisional application No. 62/905,485, filed on Sep. 25, 2019.

(51) Int. Cl.
   *A61L 27/36* (2006.01)
   *B65B 5/04* (2006.01)
   *B65B 55/02* (2006.01)

(52) U.S. Cl.
   CPC ............ *A61L 27/362* (2013.01); *B65B 5/045* (2013.01); *B65B 55/02* (2013.01); *A61L 2300/404* (2013.01); *A61L 2430/04* (2013.01); *A61L 2430/40* (2013.01)

(58) Field of Classification Search
   CPC ...... A61L 27/3683; A61F 2/0095; A61F 2/12; A61F 2/0063; A61F 2240/001; B65B 5/045; B65B 55/02; B65B 55/16
   See application file for complete search history.

(56) References Cited

U.S. PATENT DOCUMENTS

| | | | |
|---|---|---|---|
| 4,776,853 A | | 10/1988 | Klement et al. |
| D298,355 S | | 11/1988 | Young |
| 4,917,112 A | | 4/1990 | Kalt |
| 5,122,470 A | * | 6/1992 | Banes .................. C12M 23/10 435/297.5 |
| 5,314,471 A | | 5/1994 | Brauker et al. |
| 5,336,616 A | | 8/1994 | Livesey et al. |
| 5,344,454 A | | 9/1994 | Clarke et al. |
| 5,453,278 A | | 9/1995 | Chan et al. |
| 5,545,223 A | | 8/1996 | Neuenfeldt et al. |
| 5,593,440 A | | 1/1997 | Brauker et al. |
| 5,653,756 A | | 8/1997 | Clarke et al. |
| 5,713,364 A | * | 2/1998 | DeBaryshe .......... G01N 21/4795 600/407 |
| 5,713,888 A | | 2/1998 | Neunfeldt et al. |
| 5,733,336 A | | 3/1998 | Neunfeldt et al. |
| 5,741,330 A | | 4/1998 | Brauker et al. |
| 5,782,912 A | | 7/1998 | Brauker et al. |
| 5,800,529 A | | 9/1998 | Brauker et al. |
| D404,134 S | | 1/1999 | Dunsheet |
| 5,882,354 A | | 3/1999 | Brauker et al. |
| 5,964,804 A | | 10/1999 | Brauker et al. |
| 6,293,970 B1 | | 9/2001 | Wolfinbarger, Jr. et al. |
| D452,121 S | | 12/2001 | Teichelman |
| D456,899 S | | 5/2002 | Levy |
| 6,497,875 B1 | | 12/2002 | Sorrell et al. |
| 6,616,685 B2 | | 9/2003 | Rousseau |
| D482,785 S | | 11/2003 | Lord |
| 6,734,018 B2 | | 5/2004 | Wolfinbarger, Jr. et al. |
| 6,743,574 B1 | | 6/2004 | Wolfinbarger, Jr. et al. |
| 6,773,458 B1 | | 8/2004 | Brauker et al. |
| 6,866,686 B2 | | 3/2005 | Ollerenshaw et al. |
| 6,933,326 B1 | | 8/2005 | Griffey et al. |
| 7,049,478 B1 | | 5/2006 | Smith |
| D537,948 S | | 3/2007 | Smith |
| 7,358,284 B2 | | 4/2008 | Griffey et al. |
| 7,476,249 B2 | | 1/2009 | Frank |
| 7,582,309 B2 | | 9/2009 | Rosenberg et al. |
| D609,802 S | | 2/2010 | Harren |
| 7,723,108 B2 | | 5/2010 | Truncale et al. |
| 7,799,325 B2 | | 9/2010 | Kleinsek et al. |
| 7,875,074 B2 | | 1/2011 | Chen et al. |
| 7,927,414 B2 | | 4/2011 | Yang et al. |
| 8,007,531 B2 | | 8/2011 | Frank |
| 8,067,149 B2 | | 11/2011 | Livesey et al. |
| 8,197,542 B2 | | 6/2012 | Becker |
| 8,202,317 B2 | | 6/2012 | Becker |
| 8,263,101 B2 | | 9/2012 | Owens et al. |
| 8,268,361 B2 | | 9/2012 | Ahlfors |
| 8,324,449 B2 | | 12/2012 | McQuillan et al. |
| 8,343,717 B2 | | 1/2013 | Owens et al. |
| 8,415,159 B2 | | 4/2013 | Ward et al. |
| 8,425,600 B2 | | 4/2013 | Maxwell |
| D683,858 S | | 6/2013 | Smith |
| 8,486,616 B2 | | 7/2013 | Owens et al. |
| 8,557,581 B2 | | 10/2013 | Ngo et al. |
| 8,563,232 B2 | | 10/2013 | Wolfinbarger, Jr. et al. |
| 8,563,234 B2 | | 10/2013 | Tousimis |
| D693,888 S | | 11/2013 | Webster |
| 8,623,398 B2 | | 1/2014 | Altman et al. |
| 8,628,791 B2 | | 1/2014 | Altman et al. |
| 8,633,027 B2 | | 1/2014 | Altman et al. |
| 8,685,426 B2 | | 4/2014 | Altman et al. |
| D705,429 S | | 5/2014 | Cheney et al. |
| 8,735,054 B1 | | 5/2014 | Sun et al. |
| 8,746,014 B2 | | 6/2014 | Montarino |
| 8,758,781 B2 | | 6/2014 | Ward et al. |
| 8,764,824 B2 | | 7/2014 | Ledergerber |
| 8,764,825 B2 | | 7/2014 | Ledergerber |
| 8,777,965 B2 | | 7/2014 | Chen et al. |
| 8,784,486 B2 | | 7/2014 | Schuessler |
| 8,784,499 B2 | | 7/2014 | Owens et al. |
| 8,802,920 B2 | | 8/2014 | McQuillan et al. |
| 8,858,629 B2 | | 10/2014 | Moses et al. |
| 8,916,742 B2 | | 12/2014 | Smith |
| 8,936,651 B2 | | 1/2015 | Yang et al. |
| D723,166 S | | 2/2015 | Igaki |
| 8,986,377 B2 | | 3/2015 | Richter et al. |
| 9,027,213 B2 | | 5/2015 | Tousimis |
| 9,050,177 B2 | | 6/2015 | Markman |
| 9,066,884 B2 | | 6/2015 | Altman et al. |
| 9,078,731 B2 | | 7/2015 | Montarino |
| 9,089,501 B2 | | 7/2015 | Altman et al. |
| 9,089,523 B2 | | 7/2015 | Xu et al. |
| 9,114,003 B2 | | 8/2015 | Kalus |
| 9,150,318 B1 | | 10/2015 | Sun et al. |
| 9,162,011 B2 | | 10/2015 | Stilwell et al. |
| 9,180,143 B2 | | 11/2015 | Bolland et al. |
| 9,199,002 B2 | | 12/2015 | Mao et al. |
| 9,204,953 B2 | | 12/2015 | Mortarino |
| 9,204,954 B2 | | 12/2015 | Mortarino |
| 9,206,442 B2 | | 12/2015 | Chen |
| 9,220,259 B2 | | 12/2015 | Owens et al. |
| 9,238,793 B2 | | 1/2016 | Chen et al. |
| 9,271,821 B2 | | 3/2016 | Roock et al. |
| 9,277,986 B2 | | 3/2016 | Moses et al. |
| 9,308,070 B2 | | 4/2016 | Mortarino |
| D757,950 S | | 5/2016 | Karlsson |
| 9,326,840 B2 | | 5/2016 | Mortarino |
| 9,336,435 B1 | | 5/2016 | Ozog |
| 9,351,819 B2 | | 5/2016 | Harper |
| 9,370,536 B2 | | 6/2016 | Sun et al. |
| 9,375,017 B2 | | 6/2016 | Hazylett et al. |
| 9,375,513 B2 | | 6/2016 | Sun et al. |
| 9,382,422 B2 | | 7/2016 | Owens et al. |
| 9,426,980 B2 | | 8/2016 | Tousimis |
| 9,504,770 B2 | | 11/2016 | Xu et al. |
| 9,532,863 B2 | | 1/2017 | Hazylett |
| 9,532,866 B2 | | 1/2017 | Kim et al. |
| 9,539,086 B2 | | 1/2017 | Schuessler et al. |
| 9,549,805 B2 | | 1/2017 | Hazylett et al. |
| 9,549,812 B2 | | 1/2017 | Shetty et al. |
| 9,579,420 B2 | | 2/2017 | Wolfinbarger et al. |
| 9,585,744 B2 | | 3/2017 | Moses et al. |
| 9,585,986 B2 | | 3/2017 | Wolfinbarger et al. |
| 9,592,254 B2 | | 3/2017 | Monteiro et al. |
| 9,592,278 B2 | | 3/2017 | Sun et al. |
| 9,622,845 B2 | | 4/2017 | Markman |
| 9,636,435 B2 | | 5/2017 | Sun et al. |
| 9,681,941 B2 | | 6/2017 | Griffin et al. |
| 9,782,436 B2 | | 10/2017 | Sun |
| 9,808,338 B2 | | 11/2017 | Schuessler |
| 9,876,899 B2 | | 1/2018 | Wang et al. |
| 9,888,999 B2 | | 2/2018 | Forsell et al. |
| 9,901,440 B2 | | 2/2018 | Liu et al. |
| D815,741 S | | 4/2018 | Schuldt-Hempe |
| 9,936,688 B2 | | 4/2018 | Wolfinbarger, Jr. et al. |
| 9,956,072 B2 | | 5/2018 | Diaz et al. |
| 9,956,316 B2 | | 5/2018 | Chen |

(56) References Cited

U.S. PATENT DOCUMENTS

| | | |
|---|---|---|
| 9,957,477 B2 | 5/2018 | Chen et al. |
| 9,999,637 B2 | 6/2018 | Owens et al. |
| 10,004,590 B2 | 6/2018 | Shetty et al. |
| 10,022,214 B2 | 7/2018 | Hazylett |
| 10,039,633 B2 | 8/2018 | Ansorge et al. |
| RE47,100 E | 10/2018 | Smith et al. |
| 10,105,862 B1 | 10/2018 | Koch et al. |
| D841,172 S | 2/2019 | Bannwart |
| 10,231,874 B2 | 3/2019 | Mumby et al. |
| 10,238,485 B2 | 3/2019 | Locamo et al. |
| D851,261 S | 6/2019 | Ricks |
| D856,517 S | 8/2019 | Spiegel et al. |
| 10,449,034 B2 | 10/2019 | Bowley et al. |
| D865,976 S | 11/2019 | Ahsani |
| D875,251 S | 2/2020 | Ferguson |
| D875,252 S | 2/2020 | Ferguson |
| D875,957 S | 2/2020 | Bannwart |
| D876,645 S | 2/2020 | Zhang |
| D876,646 S | 2/2020 | Kase et al. |
| D879,978 S | 3/2020 | Bannwart |
| 10,624,698 B2 | 4/2020 | Anderson et al. |
| 10,835,370 B2 | 11/2020 | Bowley et al. |
| 10,945,831 B2 | 3/2021 | Bunce et al. |
| 11,179,235 B2 | 11/2021 | Bowley et al. |
| 11,246,697 B2 | 2/2022 | Markman |
| D953,544 S | 5/2022 | Igwebuike |
| 11,877,921 B2 | 1/2024 | Markman |
| D1,059,602 S | 1/2025 | Caneppele |
| D1,066,688 S | 3/2025 | Li |
| 2001/0002000 A1* | 5/2001 | Kumar ............... A61M 60/871 427/127 |
| 2003/0083752 A1 | 5/2003 | Wolfinbarger, Jr. et al. |
| 2003/0092969 A1* | 5/2003 | O'Malley ............. A61B 17/02 600/216 |
| 2004/0162512 A1 | 8/2004 | Liedtke et al. |
| 2004/0260315 A1 | 12/2004 | Dell et al. |
| 2005/0028228 A1 | 2/2005 | McQuillan et al. |
| 2005/0186286 A1 | 8/2005 | Takami |
| 2005/0246035 A1 | 11/2005 | Wolfinbarger, Jr. et al. |
| 2006/0015128 A1* | 1/2006 | Fard .................... A61B 17/322 606/167 |
| 2006/0210960 A1 | 9/2006 | Livesey et al. |
| 2007/0207125 A1 | 9/2007 | Bothwell et al. |
| 2007/0244568 A1 | 10/2007 | Matsuda et al. |
| 2007/0269791 A1 | 11/2007 | Takami et al. |
| 2008/0058692 A1 | 3/2008 | Propp et al. |
| 2008/0097601 A1* | 4/2008 | Codori-Hurff ............ A61F 2/12 623/7 |
| 2008/0154366 A1 | 6/2008 | Frank |
| 2008/0281419 A1 | 11/2008 | Matheny et al. |
| 2009/0065014 A1 | 3/2009 | Nageta |
| 2009/0198332 A1 | 8/2009 | Becker |
| 2009/0198333 A1 | 8/2009 | Becker |
| 2009/0312685 A1 | 12/2009 | Olsen et al. |
| 2010/0003306 A1 | 1/2010 | Von Waldburg-Zeil |
| 2010/0010627 A1 | 1/2010 | Matheny |
| 2010/0028396 A1 | 2/2010 | Ward et al. |
| 2010/0040687 A1 | 2/2010 | Pedrozo et al. |
| 2010/0067106 A1 | 3/2010 | Woker et al. |
| 2010/0082048 A1 | 4/2010 | Granja Filho |
| 2010/0112543 A1 | 5/2010 | Ngo et al. |
| 2010/0191330 A1 | 7/2010 | Lauryssen et al. |
| 2010/0216206 A1 | 8/2010 | Marzaro |
| 2010/0272782 A1 | 10/2010 | Owens et al. |
| 2010/0285587 A1 | 11/2010 | Ollerenshaw et al. |
| 2010/0310628 A1 | 12/2010 | Waldburg-Zeil |
| 2011/0022171 A1 | 1/2011 | Richter et al. |
| 2011/0035004 A1 | 2/2011 | Maxwell |
| 2011/0054604 A1 | 3/2011 | Becker |
| 2011/0054605 A1 | 3/2011 | Becker |
| 2011/0106249 A1 | 5/2011 | Becker |
| 2011/0167602 A1 | 7/2011 | Altman et al. |
| 2011/0184227 A1 | 7/2011 | Altman et al. |
| 2011/0276039 A1 | 11/2011 | Markman |
| 2011/0288568 A1 | 11/2011 | Capuzziello |
| 2012/0010728 A1* | 1/2012 | Sun ..................... A61L 27/3691 623/23.72 |
| 2012/0012068 A1 | 1/2012 | Costello |
| 2012/0034191 A1 | 2/2012 | Maltheny |
| 2012/0040013 A1 | 2/2012 | Owens et al. |
| 2012/0053690 A1 | 3/2012 | Frank |
| 2012/0059411 A1 | 3/2012 | Sun et al. |
| 2012/0061004 A1 | 3/2012 | Towler |
| 2012/0065649 A1 | 3/2012 | Towler |
| 2012/0158134 A1 | 6/2012 | Codori-Hurff et al. |
| 2012/0221105 A1 | 8/2012 | Altman et al. |
| 2012/0226352 A1 | 9/2012 | Becker |
| 2012/0263763 A1 | 10/2012 | Sun et al. |
| 2012/0265218 A1 | 10/2012 | Chen et al. |
| 2012/0276213 A1 | 11/2012 | Chen |
| 2012/0283826 A1 | 11/2012 | Moses et al. |
| 2012/0310367 A1 | 12/2012 | Connor |
| 2012/0329034 A1 | 12/2012 | Chun et al. |
| 2013/0013068 A1 | 1/2013 | Forsell et al. |
| 2013/0103061 A1 | 4/2013 | Harper |
| 2013/0121970 A1 | 5/2013 | Owens et al. |
| 2013/0144356 A1 | 6/2013 | Horn et al. |
| 2013/0156744 A1 | 6/2013 | Taylor et al. |
| 2013/0158658 A1 | 6/2013 | Hazylett |
| 2013/0211519 A1 | 8/2013 | Dempsey |
| 2013/0224260 A1 | 8/2013 | Ward et al. |
| 2013/0287741 A1 | 10/2013 | Stilwell et al. |
| 2013/0317610 A1 | 11/2013 | Ledergerber |
| 2014/0081397 A1 | 3/2014 | Kalus |
| 2014/0100656 A1 | 4/2014 | Namnoum et al. |
| 2014/0257481 A1 | 9/2014 | Brooks et al. |
| 2014/0257482 A1 | 9/2014 | Ward et al. |
| 2014/0276957 A1 | 9/2014 | Locamo et al. |
| 2014/0296623 A1 | 10/2014 | Owens et al. |
| 2014/0335144 A1 | 11/2014 | Ward et al. |
| 2015/0012089 A1 | 1/2015 | Shetty et al. |
| 2015/0037436 A1 | 2/2015 | Huang et al. |
| 2015/0150674 A1 | 6/2015 | Ansorge et al. |
| 2015/0157451 A1 | 6/2015 | Bowley et al. |
| 2015/0159066 A1 | 6/2015 | Hartwell et al. |
| 2015/0209128 A1 | 7/2015 | Markman |
| 2015/0223928 A1 | 8/2015 | Limem et al. |
| 2015/0250582 A1 | 9/2015 | Greehalgh et al. |
| 2015/0297798 A1 | 10/2015 | Badylak et al. |
| 2015/0320911 A1 | 11/2015 | Sun et al. |
| 2015/0351891 A1 | 12/2015 | Moses et al. |
| 2016/0000970 A1 | 1/2016 | Rosines |
| 2016/0008514 A1 | 1/2016 | Jones |
| 2016/0022416 A1 | 1/2016 | Felix et al. |
| 2016/0025344 A1 | 1/2016 | Bertoldi et al. |
| 2016/0030487 A1 | 2/2016 | Bachrach et al. |
| 2016/0030636 A1 | 2/2016 | Muir |
| 2016/0045198 A1 | 2/2016 | Bachrach |
| 2016/0067106 A1 | 3/2016 | Howell et al. |
| 2016/0135940 A1 | 5/2016 | Roock et al. |
| 2016/0151062 A1 | 6/2016 | Bachrach |
| 2016/0199173 A1 | 7/2016 | Liu et al. |
| 2016/0256259 A1 | 9/2016 | Wirth et al. |
| 2016/0256606 A1 | 9/2016 | Sun et al. |
| 2016/0262835 A1 | 9/2016 | Davila et al. |
| 2016/0271295 A1 | 9/2016 | Sun et al. |
| 2016/0287747 A1 | 10/2016 | Schallenberger |
| 2016/0287765 A1 | 10/2016 | Canner et al. |
| 2016/0331504 A1 | 11/2016 | Wang et al. |
| 2017/0007394 A1 | 1/2017 | Shetty et al. |
| 2017/0021058 A1 | 1/2017 | Huang et al. |
| 2017/0049549 A1 | 2/2017 | Bayat et al. |
| 2017/0049929 A1 | 2/2017 | Xu et al. |
| 2017/0049932 A1 | 2/2017 | Badylak et al. |
| 2017/0071725 A1 | 3/2017 | Barere et al. |
| 2017/0072110 A1 | 3/2017 | Ringo |
| 2017/0100509 A1 | 4/2017 | Sun et al. |
| 2017/0143475 A1 | 5/2017 | Moses et al. |
| 2017/0189165 A1 | 7/2017 | Hristov et al. |
| 2017/0202661 A1 | 7/2017 | Griffin et al. |
| 2017/0209619 A1 | 7/2017 | Monteiro et al. |
| 2017/0216008 A1 | 8/2017 | Markman |
| 2017/0216009 A1 | 8/2017 | Felix et al. |
| 2017/0224460 A1 | 8/2017 | Ringo |

(56) References Cited

U.S. PATENT DOCUMENTS

| | | |
|---|---|---|
| 2017/0224869 A1 | 8/2017 | Shah et al. |
| 2017/0231753 A1 | 8/2017 | Lee |
| 2017/0281333 A1 | 10/2017 | Locarno et al. |
| 2017/0340037 A1 | 11/2017 | Bailey et al. |
| 2017/0340437 A1 | 11/2017 | Bowley et al. |
| 2017/0348088 A1 | 12/2017 | Bunce et al. |
| 2017/0348353 A1 | 12/2017 | Sun |
| 2017/0348460 A1 | 12/2017 | Fang et al. |
| 2017/0367807 A1 | 12/2017 | Chen et al. |
| 2018/0008745 A1 | 1/2018 | Park et al. |
| 2018/0021087 A1 | 1/2018 | Anderson et al. |
| 2018/0044629 A1 | 2/2018 | Qin et al. |
| 2018/0055624 A1 | 3/2018 | Barere et al. |
| 2018/0092737 A1 | 4/2018 | Barere et al. |
| 2018/0110612 A1 | 4/2018 | Schuessler et al. |
| 2018/0214262 A1 | 8/2018 | Diaz et al. |
| 2018/0214607 A1 | 8/2018 | Chen |
| 2018/0216062 A1 | 8/2018 | Chen et al. |
| 2018/0221136 A1 | 8/2018 | Kaplan et al. |
| 2018/0264037 A1 | 9/2018 | Owens et al. |
| 2018/0280132 A1 | 10/2018 | Shetty et al. |
| 2018/0333252 A1 | 11/2018 | Ansorge et al. |
| 2020/0008930 A1 | 1/2020 | Bowley et al. |
| 2020/0054429 A1 | 2/2020 | Towfigh |
| 2020/0078165 A1 | 3/2020 | Spiegel et al. |
| 2020/0100892 A1 | 4/2020 | Limem et al. |
| 2020/0246506 A1 | 8/2020 | Xu |
| 2021/0015602 A1 | 1/2021 | Bowley et al. |
| 2021/0022848 A1 | 1/2021 | Spiegel et al. |
| 2021/0085443 A1* | 3/2021 | Kocak .................. A61F 2/0095 |
| 2021/0260245 A1 | 8/2021 | Peres et al. |
| 2022/0133955 A1 | 5/2022 | McQueen et al. |
| 2023/0068127 A1 | 3/2023 | Long et al. |
| 2024/0091408 A1 | 3/2024 | Barere et al. |
| 2024/0122693 A1 | 4/2024 | Markman |
| 2024/0226385 A9 | 7/2024 | Lee et al. |
| 2024/0390553 A1 | 11/2024 | Xu et al. |
| 2025/0049559 A1* | 2/2025 | Locarno ............. A61L 27/3683 |
| 2025/0049988 A1 | 2/2025 | Castillo |

FOREIGN PATENT DOCUMENTS

| | | |
|---|---|---|
| AU | 2019043393 | 6/2019 |
| AU | 202410857 | 5/2024 |
| AU | 202412832 | 7/2024 |
| AU | 202412833 | 7/2024 |
| AU | 202412834 | 7/2025 |
| CA | 186423 | 3/2019 |
| CA | 2767399 | 3/2019 |
| CA | 3053144 | 8/2019 |
| CA | 3031402 | 10/2021 |
| CN | 102470032 A | 5/2012 |
| CN | 104640577 A | 5/2015 |
| CN | 105078613 A | 11/2015 |
| DK | 2456391 T3 | 8/2020 |
| EP | 2 456 391 | 1/2011 |
| EP | 2692363 A1 | 2/2014 |
| EP | 2692364 A1 | 2/2014 |
| EP | 2926840 A1 | 10/2015 |
| EP | 3034038 A1 | 6/2016 |
| EP | 3056167 A1 | 8/2016 |
| EP | 3056168 A1 | 8/2016 |
| EP | 006280178 | 3/2019 |
| EP | 19190980.3 | 8/2019 |
| EP | 3 711 710 A1 | 9/2020 |
| ES | 2810052 T3 | 3/2021 |
| FR | 2746298 | 9/1997 |
| GB | 2572410 A | 10/2019 |
| JP | 2013500062 A | 1/2013 |
| JP | 5603423 | 10/2014 |
| JP | 2015037554 A | 2/2015 |
| KR | 301294597.0000 | 2/2025 |
| KR | 300803423.000 | 7/2025 |
| SG | 177472 A | 2/2012 |
| WO | 1984/004880 | 12/1984 |
| WO | 1999/065470 | 12/1999 |
| WO | 2005/063314 A1 | 7/2005 |
| WO | 2006/045042 A1 | 4/2006 |
| WO | 2008/066883 A2 | 6/2008 |
| WO | 2008/148026 A1 | 12/2008 |
| WO | 2008154623 A2 | 12/2008 |
| WO | 2009/065013 A1 | 5/2009 |
| WO | 2010/027613 A2 | 3/2010 |
| WO | 2010/071624 A1 | 6/2010 |
| WO | 2011/011394 A2 | 1/2011 |
| WO | 2011/019361 A1 | 2/2011 |
| WO | 2012/031162 A1 | 3/2012 |
| WO | 2013/106556 A2 | 7/2013 |
| WO | 2013/126062 A2 | 8/2013 |
| WO | 2013/137664 A1 | 9/2013 |
| WO | 2013/192197 A1 | 12/2013 |
| WO | 2014008184 A1 | 1/2014 |
| WO | 2014/019672 A1 | 2/2014 |
| WO | 2014/047234 A1 | 3/2014 |
| WO | 2014/145462 A1 | 9/2014 |
| WO | 2014/160008 A1 | 10/2014 |
| WO | 2014/160124 A1 | 10/2014 |
| WO | 2015/148932 A1 | 10/2015 |
| WO | 2015/176014 A1 | 11/2015 |
| WO | 2016/130559 A1 | 8/2016 |
| WO | 2016144475 A1 | 9/2016 |
| WO | 2018/195476 A1 | 10/2018 |
| WO | 2019/157048 A1 | 8/2019 |
| WO | 2023/034313 A1 | 3/2023 |

OTHER PUBLICATIONS

US 9,858,647, 10/2014, Markman (withdrawn)
Dermacell—The New Alternative for Breast Reconstruction, LifeNet Health, www.AccessLifeNetHealth.org, Skin and Wound Allograft Institute www.swai.org, 2011, 4 pp.
Dermacell—DermaCELL AWM Pictorial—Clinical Applications—Hospital Innovations Limited, 28 pp.
Paydar, Keyianoosh Z., et al., "Prepectoral Breast Reconstruction with Fenestrated Acellular Dermal Matrix: A Novel Design", www.PRSGlobalOpen.com, 2018, 4 pp.
Dermacell—Advanced Decellularized Dermis for Diabetic Foot Ulcers and Chronic Wounds, Hospital Innovations Limited, www.hospitalinnovations.com, 4 pp.
Dermacell—The New Alternative—Decellularized Dermis for Reconstructive Surgical Applications, Hospital Innovations, www.hospitalinnovations.com, 4 pp.
Dermacell—Application Guide, Hospital Innovations, www.hospitalinnovations.com, 8 pp.
Dermacell—Advanced Wound Management—Breast Reconstruction—Scalp Repair—Soft Tissue Reconstruction, Hospital Innovations, www.hospitalinnovations.com, 2 pp.
FlexHD Pliable—Specifically designed for breast reconstruction, Musculoskeletal Transplant Foundation, mtf.org, 6 pp.
International Search Report and Written Opinion issued for PCT/US2020/042486 Dated Oct. 16, 2020, 9 pp.
Allosource: AlloMend Acellular Dermal Matrix Animation. Found online Mar. 22, 2025 at youtube.com. Reference dates Aug. 16, 2021. Retrieved from https://www.youtube.com/watch?v=bj_oLJcOlpQ.
"ResearchGate: mesh pattern #1." Found online Mar. 25, 2025 at researchgate.net. Reference dated Mar. 2021. Retrieved from https://www.researchgate.net/figure/mesh-pattern-1-meshed-cuts-each-measuring-15-mm-in-length-are-placed-in-a-11_fig1_350117267.
"Big News Network: Global Acellular Dermal Matrix Market." Found online Mar. 22, 2025 at bignewsnetwork.com. Reference dated Jan. 6, 2022. Retrieved from https://www.bignewsnetwork.com/news/272113738/globalcellular-dermal-matrix-market-2021-industry-demand-andoutlook-by-players-lifenet-health-allosource-conmed-a.
"LinkedIn: U.S. Acellular Dermal Matrices Market Trends." Found online Mar. 22, 2025 at linkedin.com. Reference dated Aug. 12, 2021. Retrieved from https://www.linkedin.com/pulse/us-acellular-dermal-matrices-market-trends-drivers-restraints-bisen.

(56) References Cited

OTHER PUBLICATIONS

International Search Report and Written Opinion for Int. Appl. No. PCT/US24/041530, Dec. 4, 2024, 20 pp.
Nikkhah, Dariush, et al. "Comparing outcomes of sheet grafting with 1:1 mesh grafting in patients with thermal burns: a randomized trial." Burns 41.2 (2015): 257-264. (Year: 2015).
European Search Report issued for EP22865439.8, Apr. 3, 2025, 8 pp.
Wound Source, AlloSkin(TM) AC, Product Information, "https://www.woundsource.com/product/allosking-ac", Accessed through the Google Wayback Machine web archive from Oct. 31, 2015, Year: 2015, four pages.

\* cited by examiner

| Sample Number | Donor | Average Thickness (mm) | Pattern | Run | Start Time (s) | End Time (s) | Time (s) | Average Time (s) | Standard Deviation |
|---|---|---|---|---|---|---|---|---|---|
| 1 | 190789 | 1.23 | First Perforated 142 | 1 | 4.85 | 18.45 | 13.6 | 13.495 | 0.163 |
| | | | | 2 | 10.98 | 27.47 | 16.49** | | |
| | | | | 3 | 7.29 | 20.66 | 13.37 | | |
| 2 | | 1.044 | | 1 | 4.51 | 13.09 | 8.58 | 9.577 | 0.883 |
| | | | | 2 | 5.29 | 15.18 | 9.89 | | |
| | | | | 3 | 5.87 | 16.13 | 10.26 | | |
| 3 | | 0.916 | Second Perforated 146 | 1 | 4.41 | 11.08 | 6.67 | 6.443 | 0.235 |
| | | | | 2 | 6.85 | 13.31 | 6.46 | | |
| | | | | 3 | 6.67 | 12.87 | 6.2 | | |
| 4 | | 0.922 | | 1 | 5.22 | 11.33 | 6.11 | 6.605 | 0.700 |
| | | | | 2 | 5.21 | 17.89 | 12.68** | | |
| | | | | 3 | 4.88 | 11.98 | 7.1 | | |
| 5 | | 1.024 | Meshed 100 | 1 | 9.83 | 13.42 | 3.59 | 3.860 | 0.235 |
| | | | | 2 | 6.77 | 10.79 | 4.02 | | |
| | | | | 3 | 5.84 | 9.81 | 3.97 | | |
| 6 | | 1.162 | | 1 | 4.58 | 7.52 | 2.94 | 2.980 | 0.362 |
| | | | | 2 | 4.27 | 6.91 | 2.64 | | |
| | | | | 3 | 11.16 | 14.52 | 3.36 | | |
| 7 | 190878 | 1.316 | Meshed 100 | 1 | 4.91 | 5.83 | 0.92 | 1.117 | 0.190 |
| | | | | 2 | 4.64 | 5.94 | 1.3 | | |
| | | | | 3 | 4.42 | 5.55 | 1.13 | | |
| 8 | | 1.428 | | 1 | 4.4 | 5.73 | 1.33 | 1.187 | 0.124 |
| | | | | 2 | 4.56 | 5.68 | 1.12 | | |
| | | | | 3 | 3.1 | 4.21 | 1.11 | | |
| 9 | | 1.304 | Second Perforated 146 | 1 | 4.74 | 9.45 | 4.71 | 4.687 | 0.059 |
| | | | | 2 | 5.45 | 10.18 | 4.73 | | |
| | | | | 3 | 7.68 | 12.3 | 4.62 | | |
| 10 | | 1.166 | | 1 | 5.66 | 12.8 | 7.14 | 7.060 | 0.106 |
| | | | | 2 | 5.76 | 12.86 | 7.1 | | |
| | | | | 3 | 5.31 | 12.25 | 6.94 | | |
| 11 | | 0.944 | First Perforated 142 | 1 | 6.83 | 17.76 | 10.93 | 10.537 | 0.365 |
| | | | | 2 | 5.11 | 15.58 | 10.47 | | |
| | | | | 3 | 6.3 | 16.51 | 10.21 | | |
| 12 | | 1.13 | | 1 | 6.18 | 16.1 | 9.92 | 9.653 | 0.299 |
| | | | | 2 | 6.28 | 15.99 | 9.71 | | |
| | | | | 3 | 6.12 | 15.45 | 9.33 | | |

FIG. 8A

| | | | | | | | | | |
|---|---|---|---|---|---|---|---|---|---|
| 13 | 190546 | 1.168 | First Perforated 142 | 1 | 5.81 | 15.19 | 9.38 | 9.083 | 0.286 |
| | | | | 2 | 5.18 | 14.24 | 9.06 | | |
| | | | | 3 | 4.54 | 13.35 | 8.81 | | |
| 14 | | 0.996 | | 1 | 5.52 | 15.63 | 10.11 | 9.880 | 0.199 |
| | | | | 2 | 5.4 | 15.16 | 9.76 | | |
| | | | | 3 | 4.9 | 14.67 | 9.77 | | |
| 15 | | 1.032 | Second Perforated 146 | 1 | 4.13 | 9.99 | 5.86 | 5.747 | 0.115 |
| | | | | 2 | 6.87 | 12.62 | 5.75 | | |
| | | | | 3 | 2.98 | 8.61 | 5.63 | | |
| 16 | | 1.156 | | 1 | 4.82 | 13.62 | 8.8 | 8.480 | 0.336 |
| | | | | 2 | 5.2 | 13.71 | 8.51 | | |
| | | | | 3 | 6 | 14.13 | 8.13 | | |
| 17 | | 1.428 | Meshed 100 | 1 | 5.05 | 6.39 | 1.34 | 1.360 | 0.010 |
| | | | | 2 | 5.89 | 7.05 | 1.36 | | |
| | | | | 3 | 3.9 | 5.25 | 1.35 | | |
| 18 | | 1.51 | | 1 | 4.2 | 5.57 | 1.37 | 1.353 | 0.015 |
| | | | | 2 | 3.23 | 4.58 | 1.35 | | |
| | | | | 3 | 2.98 | 4.32 | 1.34 | | |

**Indicates outliers that were removed for data analysis

PRE-SHAPED ALLOGRAFT IMPLANT FOR RECONSTRUCTIVE SURGICAL USE AND METHODS OF MANUFACTURE AND USE, AND TOOLS FOR FORMING A PRE-SHAPED ALLOGRAFT IMPLANT FOR RECONSTRUCTIVE SURGICAL USE

REFERENCE TO PENDING PRIOR PATENT APPLICATION

This patent application is a continuation of prior U.S. patent application Ser. No. 17/899,270, filed Aug. 20, 2022 by Ergun Kocak, et al., for PRE-SHAPED ALLOGRAFT IMPLANT FOR RECONSTRUCTIVE SURGICAL USE AND METHODS OF MANUFACTURE AND USE, AND TOOLS for FORMING A PRE-SHAPED ALLOGRAFT IMPLANT FOR RECONSTRUCTIVE SURGICAL USE, which in turn is a continuation-in-part of prior U.S. patent application Ser. No. 16/707,681, filed Dec. 9, 2019 by Ergun Kocak, et al., for PRE-SHAPED ALLOGRAFT IMPLANT FOR RECONSTRUCTIVE SURGICAL USE AND METHODS OF MANUFACTURE AND USE, which in turn claims the benefit under 35 U.S.C. 119 (e) of U.S. Provisional Patent Application No. 62/905,485, filed Sep. 25, 2019 by Ergun Kocak, et al. for PRE-SHAPED ALLOGRAFT IMPLANT FOR RECONSTRUCTIVE SURGICAL USE AND METHODS OF MANUFACTURE AND USE.

Above-identified prior U.S. patent application Ser. No. 17/899,270, filed Aug. 20, 2022 by Ergun Kocak, et al., for PRE-SHAPED ALLOGRAFT IMPLANT FOR RECONSTRUCTIVE SURGICAL USE AND METHODS OF MANUFACTURE AND USE, AND TOOLS for FORMING A PRE-SHAPED ALLOGRAFT IMPLANT FOR RECONSTRUCTIVE SURGICAL USE, claims the benefit under 35 U.S.C. 119 (e) of U.S. Provisional Patent Application No. 63/238,733, filed Aug. 30, 2021 by Ergun Kocak, et al. for PRE-SHAPED ALLOGRAFT IMPLANT FOR RECONSTRUCTIVE SURGICAL USE AND METHODS OF MANUFACTURE AND USE The above-identified patent applications are hereby incorporated herein by reference.

BACKGROUND

An allograft includes bone, tendon, skin, or other types of tissue that is transplanted from one person to another. Allografts are used in a variety of medical treatments, such as knee replacements, bone grafts, spinal fusions, eye surgery, and skin grafts for reconstructive surgery and for the severely burned. Allografts come from voluntarily donated human tissue obtained from cadaveric donor-derived, living-related, or living-unrelated donors and can help patients regain mobility, restore function, enjoy a better quality of life, and even save lives in the case of cardiovascular tissue or skin.

An acellular dermal matrix (ADM) graft is a soft connective tissue graft generated by a decellularization process that preserves the intact extracellular skin matrix. Upon implantation, the ADM structure serves as a scaffold for donor-side cells to facilitate subsequent incorporation and revascularization. ADMs are manufactured utilizing known methods of decellularization by means of ionic and nonionic detergent methods, as well as those utilizing enzymatic processes and other techniques such as those listed in "Decellularization of Tissues and Organs," Gilbert, et al, 2006 (https://www.ncbi.nlm.nih.gov/pubmed/16519932).

Currently, ADM grafts are primarily derived from decellularized cadaveric skin and must be shaped and/or cut as necessary by the surgeon either prior to or during a surgical procedure. Such grafts are also commonly formed from solid or perforated ADM. As a result, existing ADM grafts present efficiency, efficacy, and repeatability challenges when used for reconstructive surgery purposes.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a method of manufacturing an acellular dermal matrix (ADM) graft product for use in a reconstructive surgical procedure. The method may include the following steps: (1) providing a portion of donor-derived skin, the portion of the donor-derived skin having a full thickness; (2) removing an epidermis layer and a fat layer from the portion of the donor-derived skin to form a portion of dermal tissue; (3) decellularizing the portion of the dermal tissue to form a portion of ADM graft material; (4) forming the portion of the ADM graft material into a pre-defined shape in anticipation of the reconstructive surgical procedure; (5) fenestrating the pre-defined shape into a mesh pattern; (6) verifying that a thickness of the pre-defined shape equals a specified thickness; (7) packaging the pre-defined shape in a medical sterilization pouch to form a packaged, pre-shaped, and meshed ADM graft; and (8) irradiating the packaged, pre-shaped, and meshed ADM graft to a sterility assurance level of $10^{-6}$ to form the ADM graft product.

Another embodiment provides a pre-shaped, meshed acellular dermal matrix (ADM) graft stored as a packaged graft product prepared by a process comprising the steps of: (1) providing a portion of ADM tissue having a thickness between 1 mm and 2 mm; (2) fenestrating the portion of the ADM tissue in a mesh pattern extending over an entirety of the portion of the ADM tissue; (3) scoring the portion of the ADM tissue into a pre-defined shape to form the pre-shaped, meshed ADM graft; (4) verifying the thickness of the pre-shaped, meshed ADM graft; (5) packaging the pre-shaped, meshed ADM graft in a medical sterilization pouch; and (6) irradiating the pre-shaped, meshed ADM graft within the medical sterilization pouch to a sterility assurance level of $10^{-6}$ to form the packaged graft product.

Yet another embodiment provides an acellular dermal matrix (ADM) graft product. The ADM graft product may include an ADM graft derived from full-thickness skin, the ADM graft having a pre-formed shape with a mesh pattern formed therein, as well as a medical sterilization pouch sealed about the ADM graft, wherein when the medical sterilization pouch and the ADM graft are irradiated to a sterility assurance level of $10^{-6}$, the ADM graft product has a shelf-life of two years.

In yet another embodiment, there is provided a method of manufacturing an acellular dermal matrix (ADM) graft product for use in a reconstructive surgical procedure. The method may include providing a portion of donor-derived skin, the portion of the donor-derived skin having a full thickness. The method may include removing an epidermis layer and a fat layer from the portion of the donor-derived skin to form a portion of dermal tissue. The method may include decellularizing the portion of the dermal tissue to form a portion of ADM graft material. The method may include forming the portion of the ADM graft material into a pre-defined shape in anticipation of the reconstructive surgical procedure, and the forming the portion of the ADM graft material into the pre-defined shape comprises at least one of scoring and cutting the portion of the ADM graft material into a domed shape ADM graft. The method may include verifying that a thickness of the pre-defined shape equals a specified thickness. The method may include packaging the domed shape ADM graft in a medical sterilization pouch to form a packaged and domed shape ADM graft. The method may include irradiating the packaged and domed shaped ADM graft to a sterility assurance level of $10^{-6}$ to form the ADM graft product.

In still another embodiment there is provided a domed shaped acellular dermal matrix (ADM) graft stored as a packaged graft product prepared by a process. The process may include a step of providing a portion of ADM tissue having a thickness between 1 mm and 2 mm. The process may include a step of scoring the portion of the ADM tissue into a pre-defined shape to form the domed shape ADM graft. The process may include a step of verifying the thickness of the domed shape ADM graft. The process may include a step of packaging the domed shaped ADM graft in a medical sterilization pouch. The process may include a step of irradiating the domed shaped ADM graft within the medical sterilization pouch to a sterility assurance level of $10^{-6}$ to form the packaged graft product.

And in yet another embodiment there is provided a tool or set of tools having a set of features for forming a domed ADM graft. The set of features may include a shaping tool feature having a shaping portion configured to shape a dome shaped ADM graft. The set of features may include a scoring tool feature having a scoring portion configured to impart a desired mesh pattern into the domed shaped ADM graft.

Other embodiments provide an ADM graft that combines the ADM as designed with antimicrobial elements that mitigate or prevent complications arising from post-surgical infections. Antimicrobial agents that are compatible with the ADM include silver in its colloidal, elemental or ionic form. The silver may be complexed with chelating agents or may be added directly to the ADM prior to final packaging. Similarly other antimicrobial agents may be combined with the ADM. Other agents well known to be used medically are chlorhexidine gluconate and antimicrobial peptides of various amino acid chain length.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 8A-8B provide a table reflecting multiple sets of drainage time measurements captured during the fluid egress testing performed using the testing device of FIGS. 7A-7B;

FIG. 9 provides a summary graft of the drainage time measurements shown in FIGS. 8A-8B;

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the products and associated methods of manufacture and use described herein relate to a pre-shaped, meshed or fenestrated acellular dermal matrix (ADM) graft derived from full-thickness human, donor-derived skin for use in the surgical reconstruction of soft tissue defects resulting from trauma, disease, or surgical intervention. For example, embodiments of the ADM graft discussed herein may be used in the surgical specialty of plastic surgery, and particularly in prepectoral and postmastectomy breast reconstruction, where the ADM graft is an adjunct to integumental repair of the surgical site.

Embodiments of the ADM graft may be packaged and irradiated for long-term sterile storage in a manner that allows them to be used in surgical procedures within two years of packaging. In use, embodiments of the pre-shaped, meshed ADM graft provide the surgeon with a mechanism to restore function to and support integumental tissue after surgical intervention in a manner that is repeatable, effective, and time efficient by leveraging a manufactured, pre-shaped and meshed ADM graft product that is derived from full-thickness skin. Embodiments of the ADM graft facilitate fluid drainage from the surgical site to discourage seroma formation, increase the rate of integration of the ADM graft with the body, and provide a reliable, repeatable solution the surgeon may use "off the shelf" rather than utilizing valuable time and resources for graft processing in preparation for or during the surgical procedure.

Figure 1A:
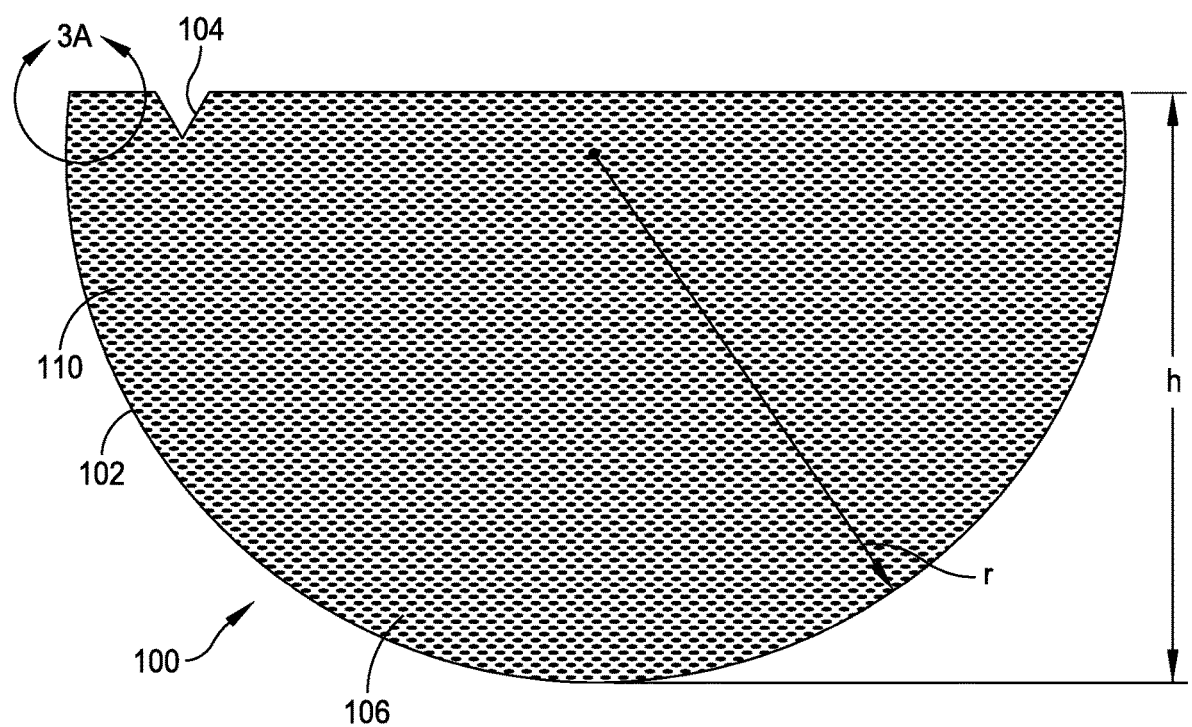
FIGS. 1A-1B illustrate respective front-plan and perspective views of one embodiment of a pre-shaped, meshed acellular dermal matrix (ADM) graft derived from full-thickness skin.
Figure 1B:
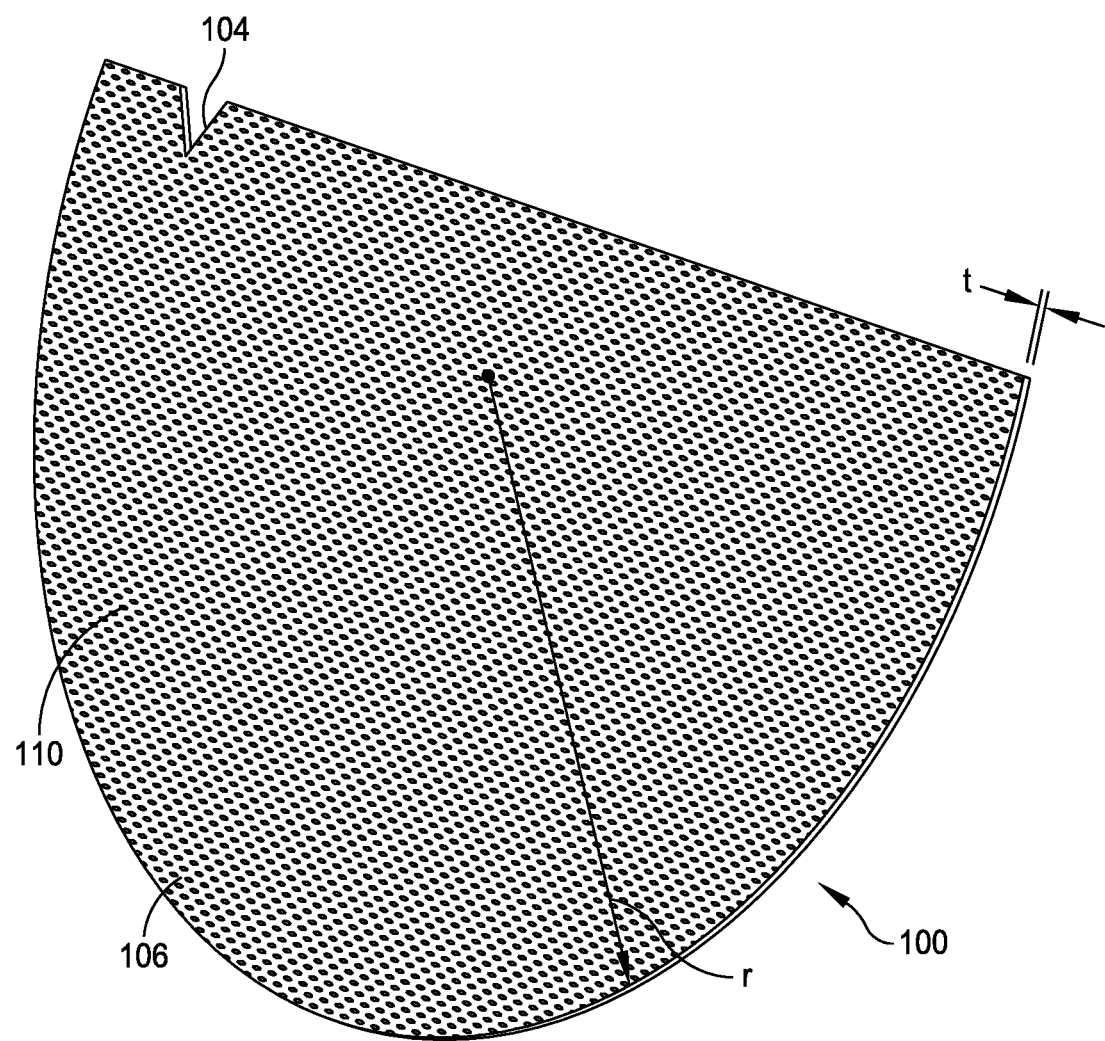

Turning to exemplary embodiments, FIGS. 1A-1B illustrate respective front-plan and perspective views of one embodiment of a pre-shaped, meshed ADM graft 100 derived from decellularized, full-thickness skin. Using full-thickness skin as the source for the ADM graft 100 ensures that the ADM graft 100 has sufficient biomechanical properties to support varying surgical requirements, including, for example, a suitable ultimate tensile strength, suture pull-out resistance, and a Young's modulus indicative of a soft and supple graft.

In this embodiment, the pre-shaped, meshed ADM graft 100 may have a pre-formed shape approximating a circle with a portion of the top removed (i.e., slightly larger than a semi-circle). In one embodiment, as detailed in FIGS. 1A-1B, the pre-shaped ADM graft may form a generally semi-circular tissue portion 102 having a radius, r, of 9 cm. The semi-circular tissue portion 102 may approximate a circle having a top portion of the circle removed in a straight line disposed perpendicular to the radius, r, of the circle. The tissue portion 102 may have a total height, h, of 10 cm, and a material thickness, t, of 1.0-2.0 mm. Additional pre-shaped ADM graft embodiments may feature various circular or elliptical shapes with diameters ranging from 10 cm to 22 cm. The circular or elliptical tissue portion of the ADM graft may feature a removed top portion, as shown in FIG. 1A-1B, or an in-tact top portion, as necessary or desired for the intended surgical preparation.

In addition, the pre-shaped, meshed ADM graft 100 may include a notch 104 to indicate which surface provides a basement membrane surface 106, or the dermal surface to be implanted towards the patient's vascular bed. In one embodiment, as shown in FIGS. 1A-1B, the notch 104 of the graft 100 may be disposed in the top left corner to indicate the basement membrane surface 106. In other embodiments, the basement membrane may be removed.

Figure 2A:
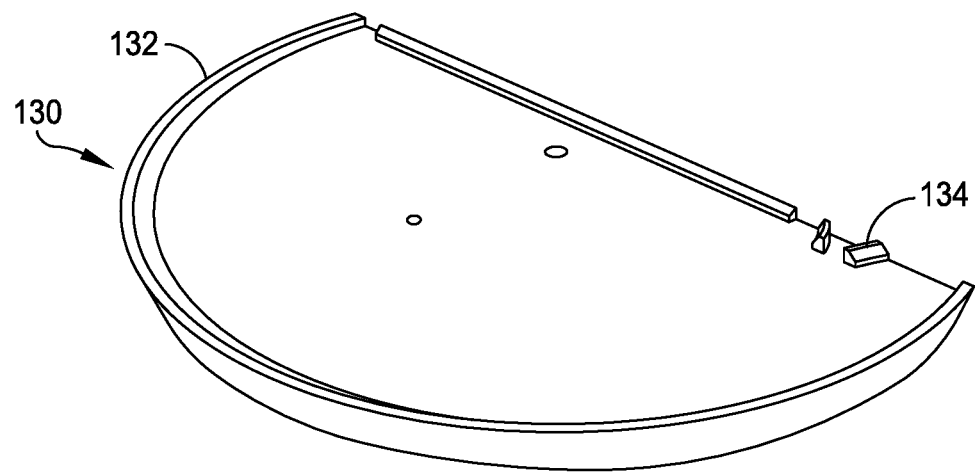
FIGS. 2A-2B illustrate respective top-perspective and bottom-perspective views of one embodiment of scoring tool for manufacturing the pre-shaped, meshed ADM graft of FIGS. 1A-1B.
Figure 2B:
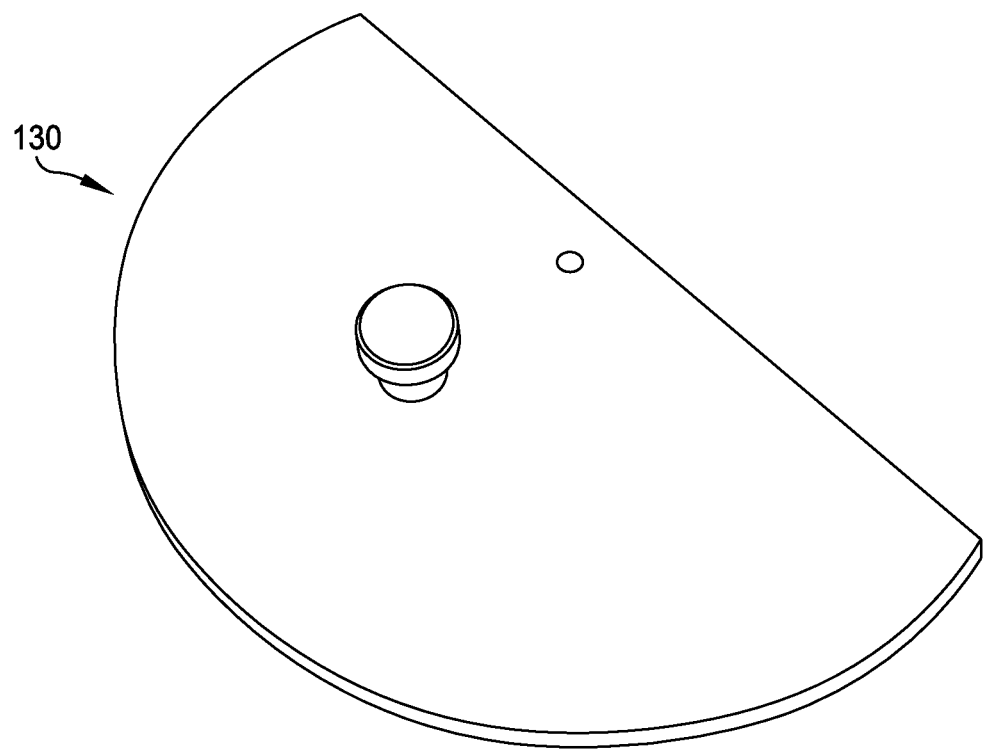

The decellularized, full-thickness dermal tissue may be shaped and cut into the pre-shaped ADM graft 100 using an appropriately designed scoring tool along with a cutting tool such as, for example, a surgical scalpel or a surgical scissor. FIGS. 2A-2B illustrate respective front and rear perspective views of one embodiment of a scoring tool 130 featuring a semi-circular edge pattern 132 that incorporates a raised notch 134 configured to form the indicator notch 104 in the pre-shaped ADM graft 100. To manufacture the pre-shaped ADM graft 100, an embodiment of the scoring tool 130 may be placed upon a portion of full-thickness dermal tissue and used to "stamp" out the notched, semi-circular tissue portion 102 from a larger ADM tissue portion. The cutting tool (not shown) may be used to trim excess tissue from around a perimeter of the scoring tool 130.

The pre-shaped nature of the ADM graft 100 disclosed herein saves the surgeon valuable time during a surgical procedure because there is no (or minimal) need for the surgeon to shape, cut, or otherwise form the ADM graft into a desired shape during surgical preparation. Instead, the surgeon may simply select an appropriately pre-shaped ADM graft for the particular surgery and proceed.

Embodiments of the pre-shaped ADM graft 100 may additionally include a mesh or fenestration pattern to allow for increased fluid flow through the graft 100, thereby reducing the chances of post-surgical seroma formation, a frequent complication after surgeries using existing ADM grafts. Pre-meshing also prevents the surgeon from having to perform any type or kind of meshing procedures during surgical preparation or during a surgical procedure and ensures an optimal mesh ratio to provide maximum fluid egress, or drainage, from the surgical site to prevent seroma formation and a maximum graft surface area for improved integration into the body post procedure.

Figure 3A:
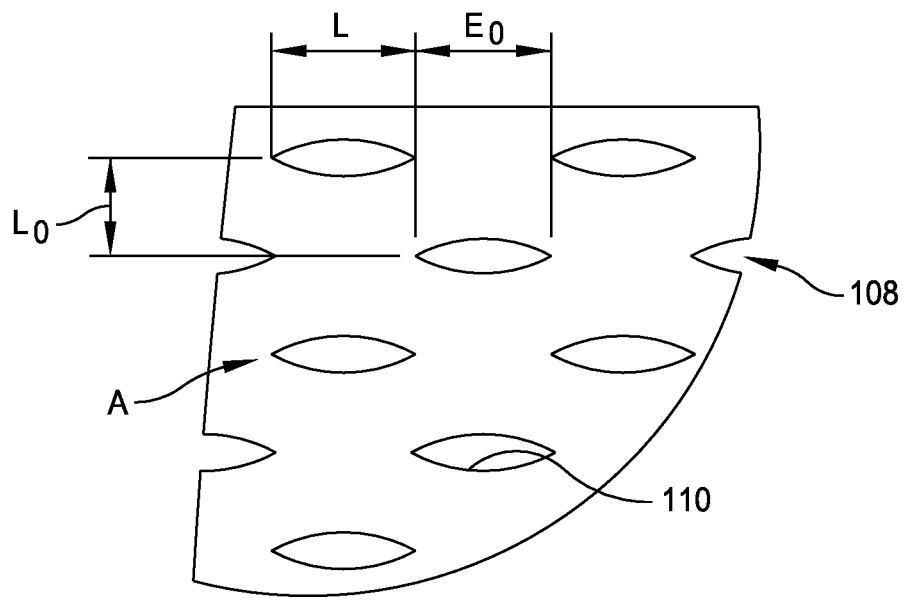
FIGS. 3A-3B illustrate front-plan views of an exemplary mesh, or fenestration, pattern of the pre-shaped, meshed ADM graft of FIGS. 1A-1B, shown in an open position and in a resting position, respectively.
Figure 3B:
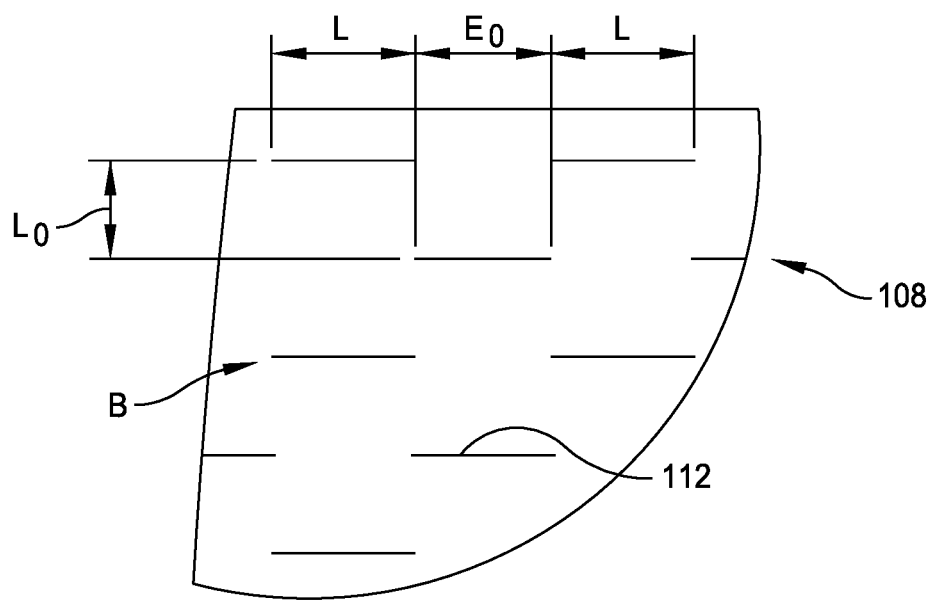

FIGS. 3A-3B illustrate respective front views of an exemplary mesh, or fenestration, pattern 108 applied to the pre-shaped, meshed ADM graft 100, shown in an open position, A, in which the mesh pattern appears as a series of holes 110 (FIG. 3A) and in a resting position, B, in which the mesh pattern 108 appears as a series of straight slits or lines 112 (FIG. 3B). In this embodiment, the mesh pattern 108 may feature a 1:1 graft:space ratio in which each mesh hole 110/line 112 has a length, L, of 1.5 mm, an end-to-end offset, $E_o$, of 1.5 mm, and a lateral offset, $L_o$, of 1 mm. Alternative embodiments may feature a different mesh ratio and/or any appropriate and/or desired material and line dimensions. For example, in one embodiment the mesh pattern 108 may feature a 2:1 graft:space ratio, with a material thickness of 0.8-2.5 mm.

Figure 4:
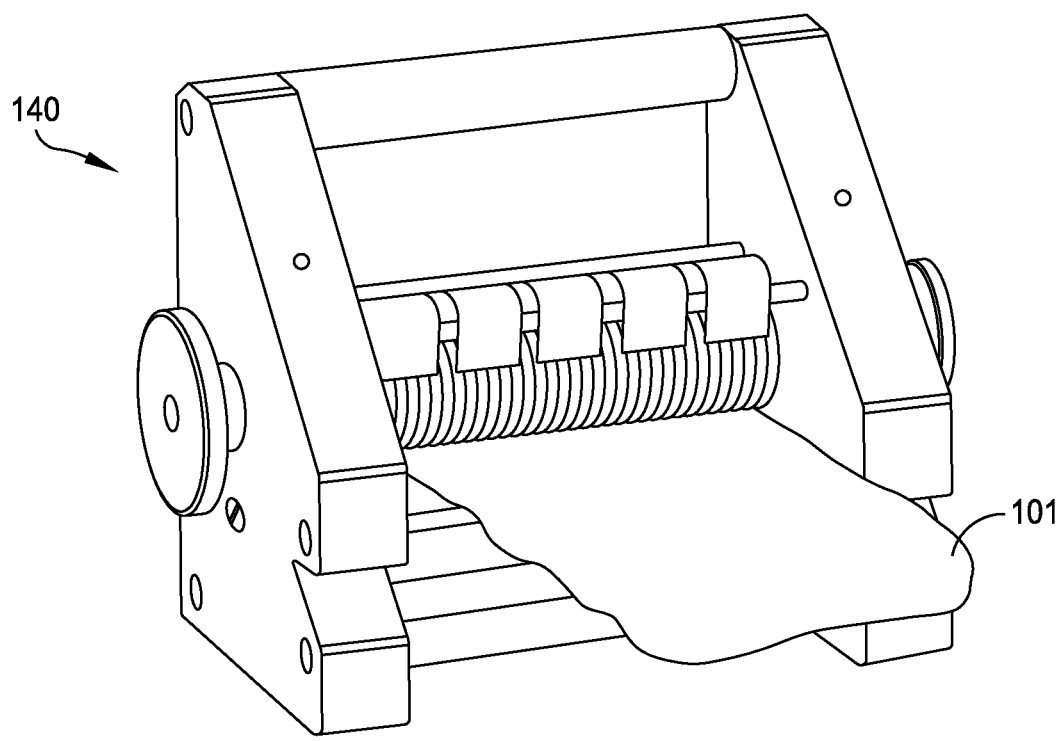
FIG. 4 illustrates a perspective view of an exemplary skin mesher for forming the mesh pattern of FIGS. 3A-3B.

The mesh or fenestration pattern 108 may be formed in the pre-shaped, meshed ADM graft 100 using a standard "skin mesher" 140 such as, for example, a 4MED (or Rosenberg) Skin Graft Mesher (Distributed by Exsurco Medical, Wakeman, Ohio). As shown in FIG. 4, a portion of decellularized, full-thickness dermal tissue 101 or, alternatively, a pre-shaped semi-circular tissue portion 102 may be inserted into the skin mesher 140, which has been adjusted to the appropriate mesh or fenestration settings, for application of the mesh pattern 108 to the tissue 101.

Figure 5:
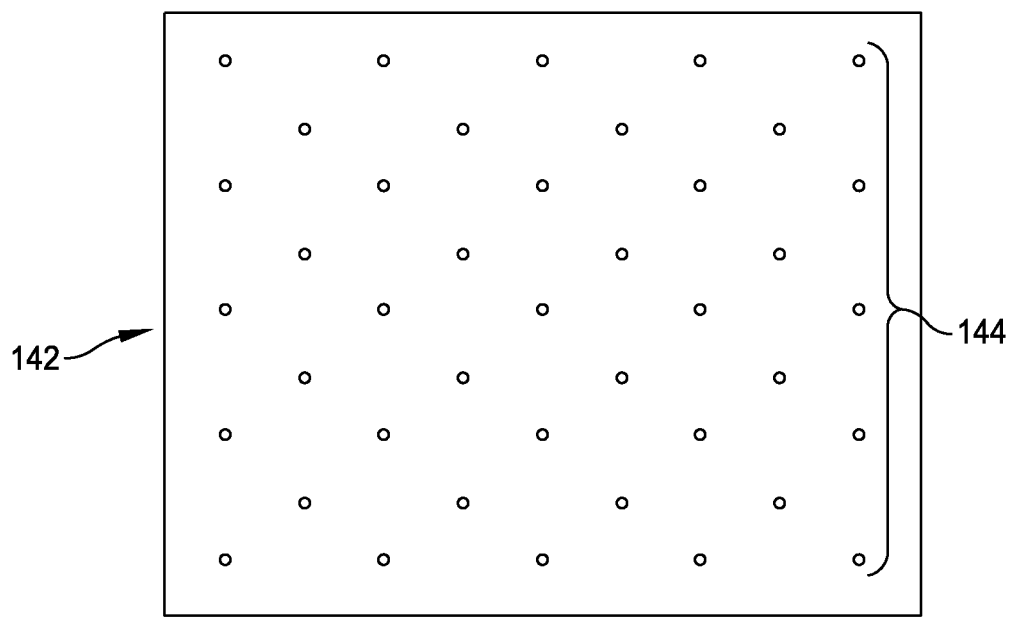
FIG. 5 illustrates a first perforated prior art ADM graft for comparison to the pre-shaped, meshed ADM graft of FIGS. 1A-1B.
Figure 6:
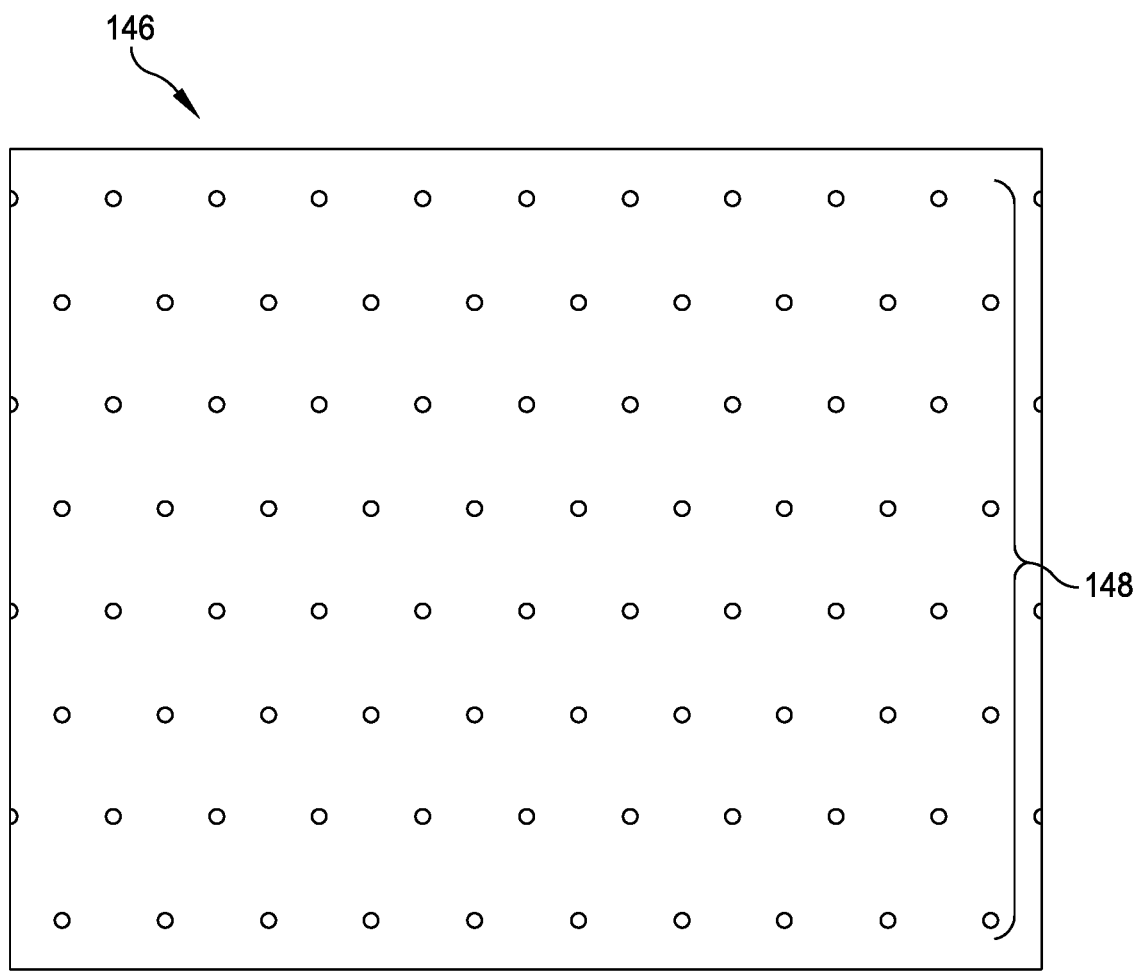
FIG. 6 illustrates a second perforated prior art ADM graft for comparison to the pre-shaped, meshed ADM graft of FIGS. 1A-1B.

A fluid egress study was completed to exhibit the increased fluid egress, or drainage, properties of the pre-shaped, meshed ADM graft 100. In the study, the fluid drainage properties of the pre-shaped, meshed ADM graft 100 were compared to those of a prior art first perforated ADM graft 142, shown in FIG. 5, having a first perforation density pattern 144 of 41 perforations per 320 $cm^2$, or approximately 0.128 perforations per $cm^2$, and a prior art second perforated ADM graft 146, shown in FIG. 6, having a second perforation density pattern 148 of 80 perforations per 320 $cm^2$, or approximately 0.25 perforations per $cm^2$ and approximately twice that of the first perforation density pattern 144. Three samples of each were tested, each sample having a thickness between 0.9-2.0 mm.

Figure 7A:
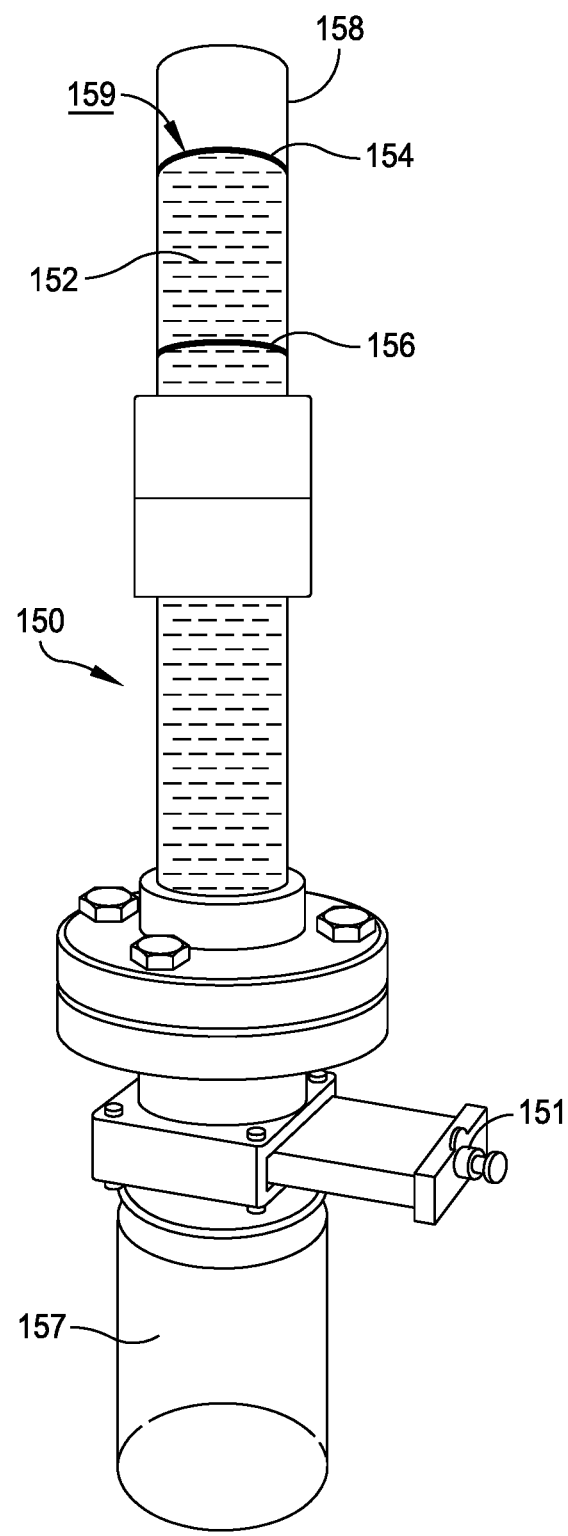
FIGS. 7A-7B illustrate perspective views of a fluid egress testing device in respective first and second stages of fluid egress testing of the pre-shaped, meshed ADM graft of FIGS. 1A-1B, the first perforated ADM graft of FIG. 5, and the second perforated ADM graft of FIG. 6.
Figure 7B:
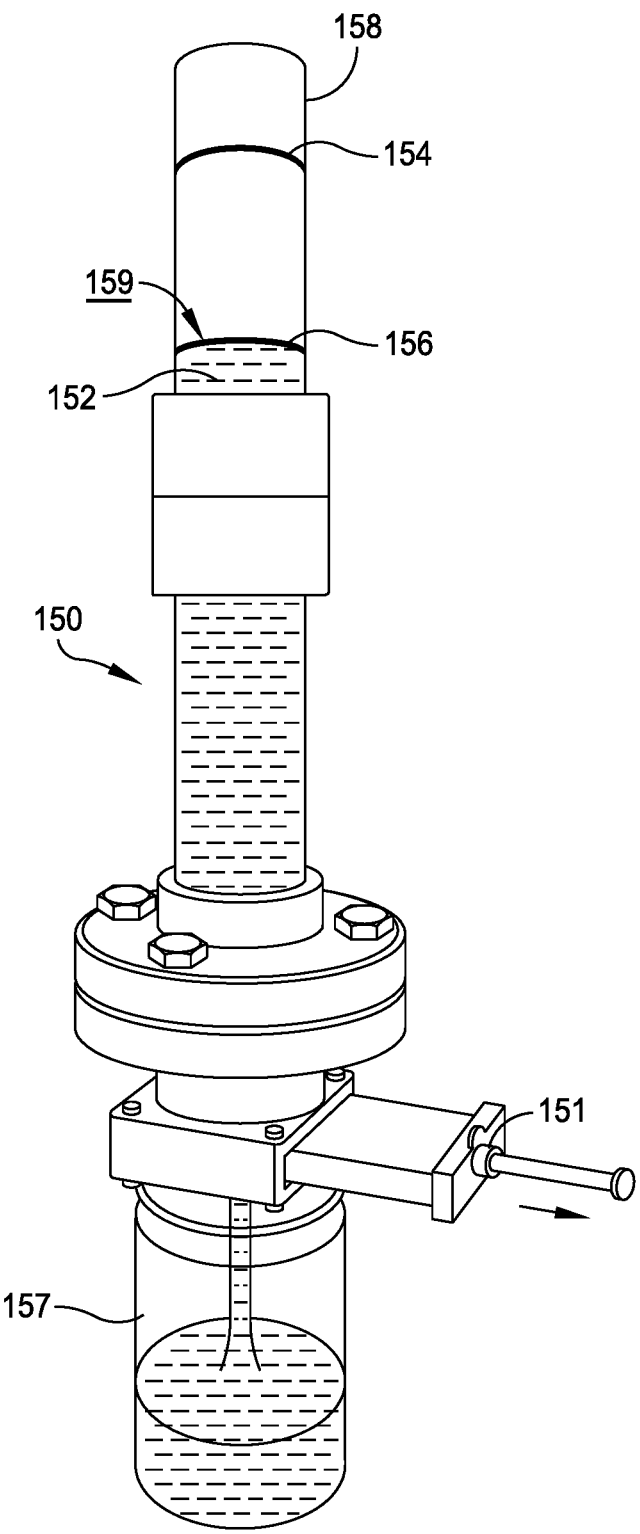
Figures 8B, 9:
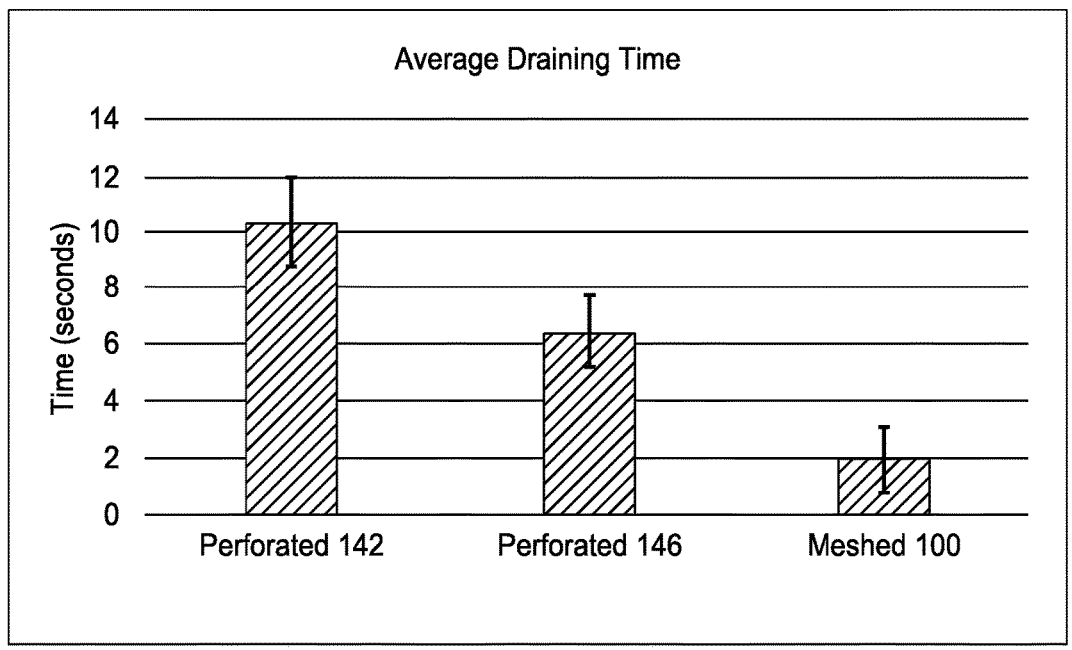

FIGS. 7A-7B illustrate perspective views of a fluid egress testing device 150 in first and second stages of egress testing, respectively. Upon release of a valve 151, a fluid 152 was passed from a fluid column 158, through the respective tested ADM graft (i.e., the pre-shaped meshed ADM graft 100, the first perforated ADM graft 142, or the second perforated ADM graft 144) stretched across the fluid column 158 (not shown) and into a waste container 157. An egress or drainage-time measurement was taken of the time required for a top surface 159 the fluid 152 to fall 8.5 inches from a first fluid-level line 154 to a second fluid-level line 156 along the fluid column 158 of the fluid egress testing device 150, as shown in FIGS. 7A-7B, respectively. The drainage time for the fluid surface 159 to pass from the first line 154 to the second line 156 was measured in triplicate for each of the pre-shaped meshed ADM graft 100, the first perforated ADM graft 142, and the second perforated ADM graft 146. The drainage time measurements are provided in the table of FIGS. 8A-8B. As summarized in the chart of FIG. 9, the fluid egress study showed that the pre-shaped, meshed ADM graft 100 having the 1:1 graft:space ratio demonstrated significantly improved fluid egress properties, namely approximately 3× and 5× faster fluid egress as compared to the first and the second perforation density patterns 144, 148 of the first and the second perforated grafts 142, 146, respectively.

As discussed above, the mesh pattern 108 also increases the surface area of the pre-shaped, meshed ADM graft 100, which, in turn, abets a rate of integration of the graft 100 during the healing process after surgical intervention. The surface area calculations below compare the pre-shaped, meshed ADM graft 100 with the first and the second perforated grafts 142, 146 having the first and the second perforation patterns 144, 148, respectively, discussed above in relation to FIGS. 5-6. In summary, the surface area of a 2×2 cm² meshed ADM graft having a 1 mm thickness and 130, 1.5 mm long mesh lines provides a 97.5% increase in surface area over a 2×2 cm² solid, non-meshed ADM graft, as shown below:

Surface Area =

(area of top of graft) + (#mesh lines)(perimeter of mesh hole)(thickness)

Surface Area = (4 cm) + (130)(2 ∗ 1.5 mm)(1 mm)

Surface Area = 4 cm + 3.9 cm = 7.9 cm

*Orignal* Solid Graft Area = (2 cm)(2 cm) = 4 cm²

Increase in Surface Area from Meshing = $\frac{7.9 - 4}{4} * 100\% = 97.5\%$

The first perforated graft 142 having a 16 cm×20 cm perimeter and a 1 mm thickness, with a perforation density pattern 144 of 41 perforations per a 320 cm² area, each perforation having a 0.15 cm radius, provides only a 0.3% surface-area increase over a 16 cm×20 cm solid, non-meshed ADM graft, as shown below:

Surface Area =

(area of top of graft) + (# holes)(surface area of inside of hole)

Surface Area = (320 cm² − (41)(π∗.15²)) + (41)(2∗π∗.15 cm)(.1 cm)

Surface Area = 317.10188 cm² + 3.86384 cm² = 320.966 cm²

*Orignal* Solid Graft Area = (16 cm)(20 cm) = 320 cm²

Increase in Surface Area from Perforating =

$\frac{320.966 - 320}{320} * 100\% = 0.3\%$

The second perforated graft 146 having a 16 cm×20 cm perimeter and a 1 mm thickness, with a perforation density pattern 148 of 80 perforations per a 320 cm² area, each perforation having a 0.15 cm radius, provides only a 0.59% surface-area increase over a 16 cm×20 cm solid, non-meshed ADM graft, as shown below:

Surface Area =

(area of top of graft) + (# holes)(surface area of inside of hole)

Surface Area = (320 cm² − (80)(π∗.15²)) + (80)(2∗π∗.15 cm)(.1 cm)

Surface Area = 314.34513 cm² + 7.5392 cm² = 321.884 cm²

*Orignal* Solid Graft Area = (16 cm)(20 cm) = 320 cm

Increase in Surface Area from Perforating =

$\frac{321.884 - 320}{320} * 100\% = 0.59\%$

Thus, the fenestration pattern 108 applied to the pre-shaped, meshed ADM graft 100 significantly increases the exposed surface area of the graft over both existing solid and perforated grafts. This increase causes the pre-shaped, meshed ADM graft 100 to integrate into the human body much more rapidly during the healing process after surgical intervention.

In one embodiment, the pre-shaped, meshed ADM graft 100 may be formed of the ADM derived from full-thickness skin, as discussed above, combined with antimicrobial elements that mitigate or prevent complications arising from post-surgical infections. Antimicrobial agents compatible with the ADM may include, for example, silver in its colloidal, elemental, or ionic form. The silver may be complexed with chelating agents or may be added directly to the ADM prior to final packaging. Similarly, other antimicrobial agents may be combined with the ADM. Other agents known to be used medically may include chlorhexidine gluconate and antimicrobial peptides having various amino acid chain lengths.

Figure 10:
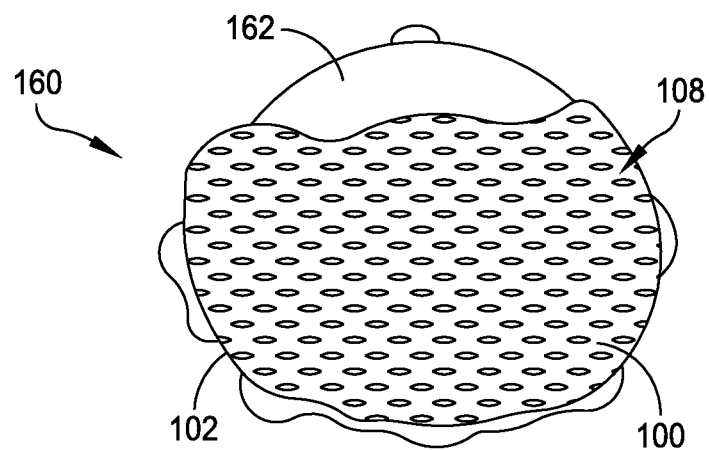
FIG. 10 illustrates a front perspective view of an ADM graft pocket formed by joining two of the pre-shaped, meshed ADM grafts of FIGS. 1A-1B together.

In one embodiment shown in FIG. 10, two pre-shaped, meshed ADM grafts 100 may be sutured together to form an ADM graft pocket 160. In this embodiment, the two pre-shaped, meshed ADM grafts 100 may be sutured together around the curved portions each of the semi-circular tissue portions 102, such that a breast implant 162 may be disposed within the ADM graft pocket 160 between the two pre-shaped, meshed ADM grafts 100. The implant 162 is thus supported from the bottom, without the need to be covered at the top. In one embodiment, the ADM graft pocket 160 may be pre-sutured and then packaged and stored for later surgical use, as discussed below in relation to FIG. 11-12, or the ADM graft pocket may be formed from two pre-shaped, meshed ADM grafts 100 and sutured by the surgeon prior to or during a surgical procedure. In another operative embodiment applicable to reconstructive surgery, the implant may be wrapped in the pre-shaped, meshed ADM graft 100 from an anterior side, and the graft 100 sutured to the chest wall.

Figure 11:
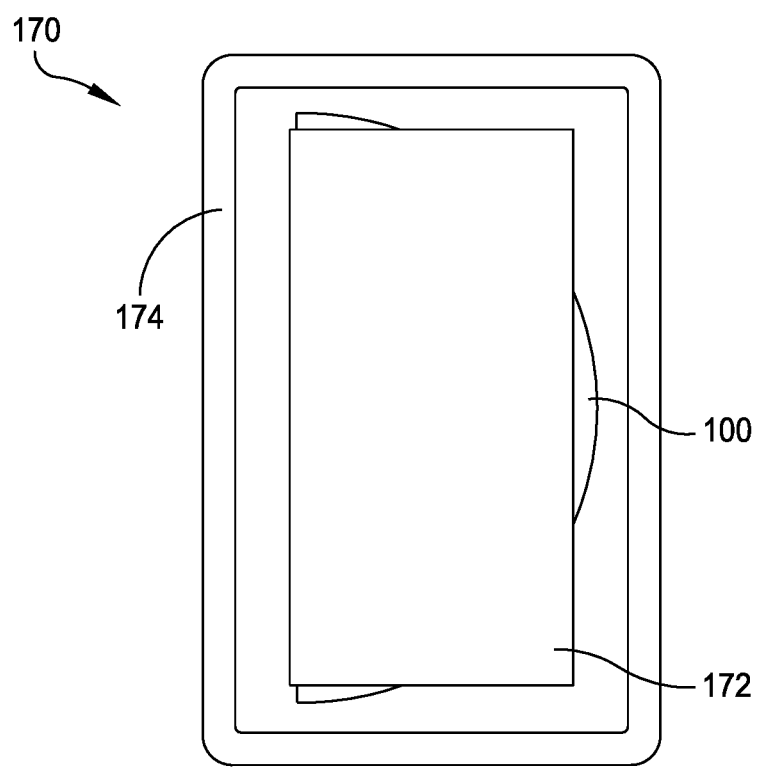
FIG. 11 illustrates a front view of a pre-shaped, meshed ADM graft product in which the pre-shaped, meshed ADM graft of FIGS. 1A-2A is packaged for storage in a sealed medical sterilization pouch.
Figure 12:
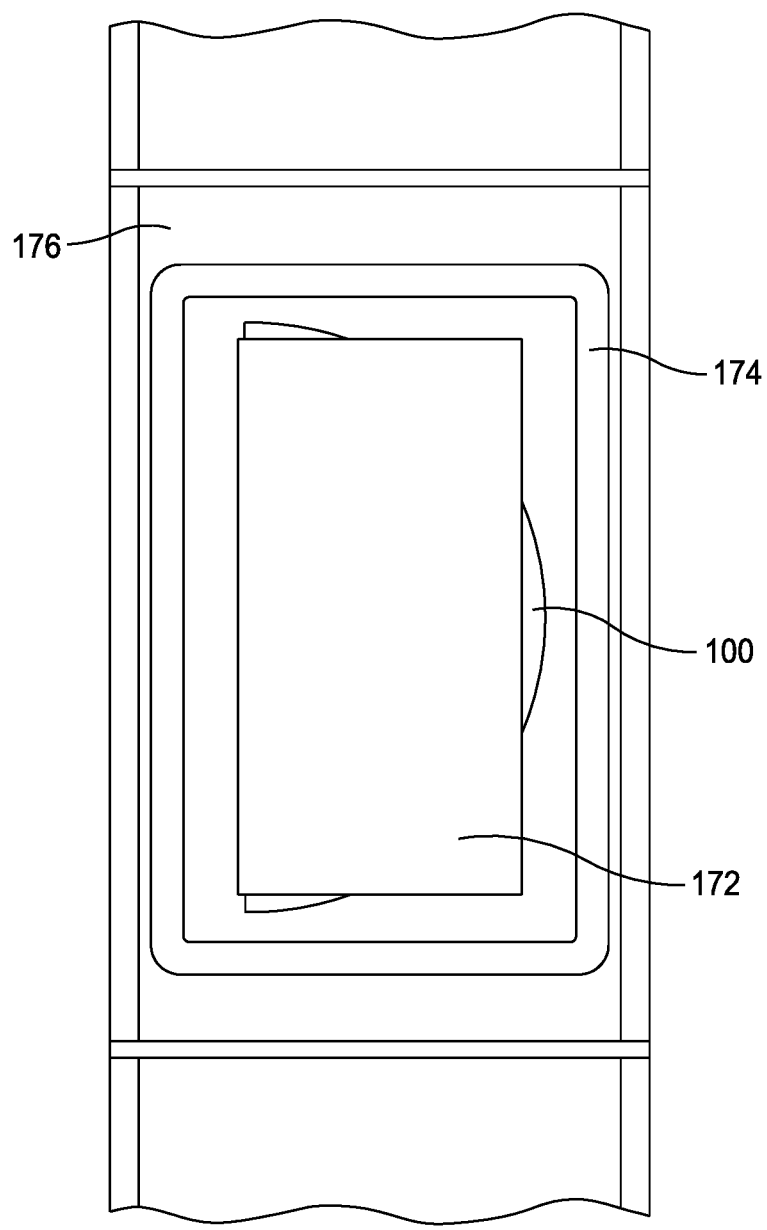
FIG. 12 illustrates the pre-shaped, meshed ADM graft product of FIG. 11 further packaged in a medical peel pouch.

After manufacture and to provide complete a shelf-stable, packaged ADM graft product 170, the pre-shaped, meshed ADM graft 100 (or the ADM graft pocket 160) may be packaged along with two opposing pieces of backing material 172 and sterile water in a sealed medical sterilization pouch 174 such as, for example, a Kapak pouch (manufactured by AMPAK Technology Inc. of Larchmont, NY), as shown in FIG. 11, or further into a sealed, peelable medical sterilization pouch 176 known as a "peel pouch" or a "chevron pouch," as shown in FIG. 12. The packaged ADM graft product 170 may then be irradiated to a sterility assurance level (SAL) of $10^{-6}$ such that it may be stored at room temperature for up to two years. The packaged ADM graft product 170 may be labeled in any appropriate manner and may include information pertaining to the raw material, the shape, a use by date, special requirements, results of a visual inspection, and so on.

Figure 13:
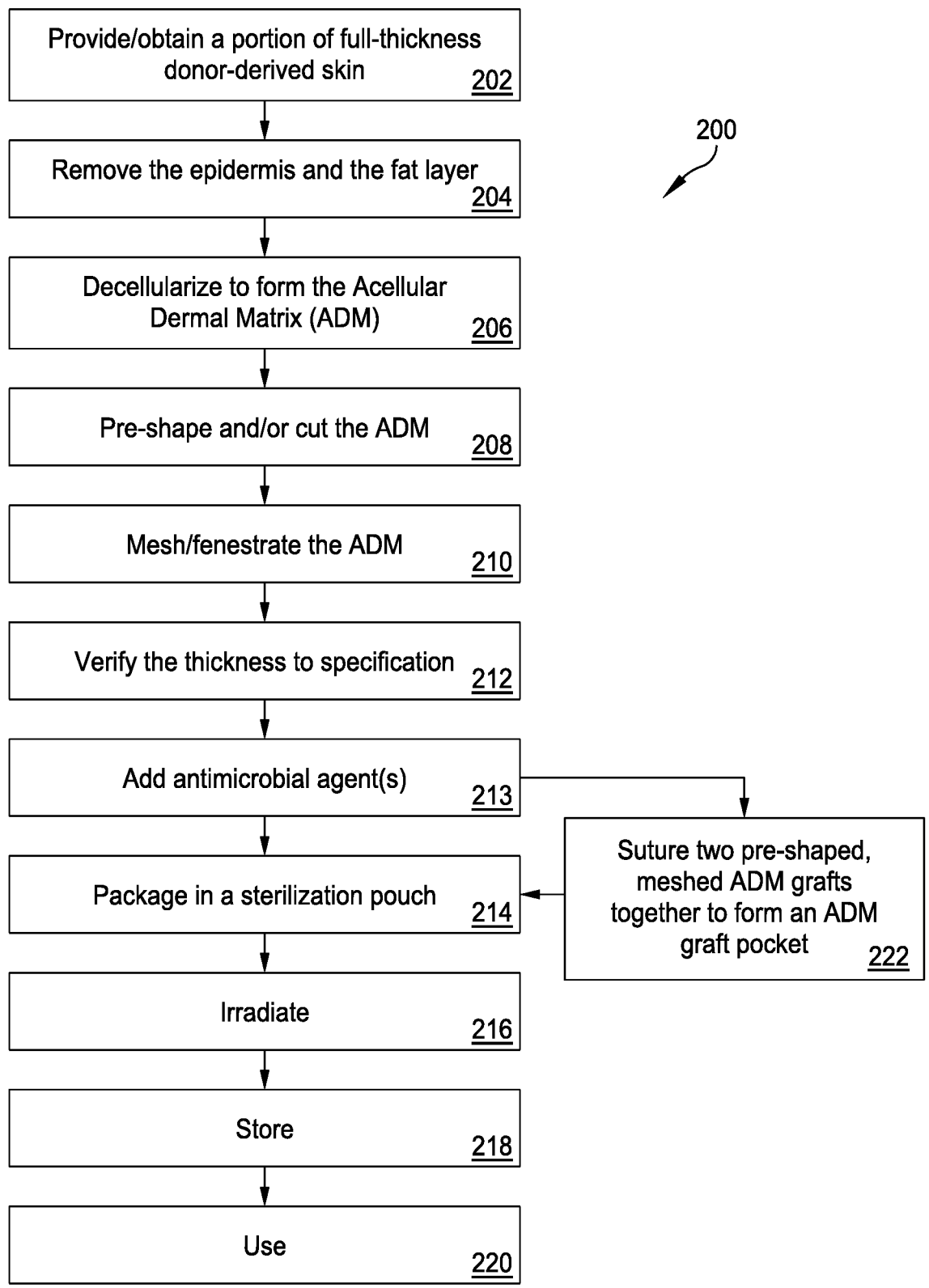
FIG. 13 provides a flowchart depicting an exemplary method of manufacturing an embodiment of the pre-shaped, meshed ADM graft of FIGS. 1A-1B and the packaged ADM graft product of FIGS. 11-12.

FIG. 13 provides a flowchart depicting an exemplary method (200) of manufacturing an embodiment of the pre-shaped, meshed ADM graft 100, the ADM graft pocket 160, and the packaged ADM graft product 170, discussed above. In this embodiment, the method may initiate with providing a portion of full-thickness donor-derived skin (202). Next, the epidermis layer and the fat layer adjacent to the dermis may be removed (204), and the dermal tissue may be decellularized according to a well-known or a proprietary decellularization process, resulting in the Acellular Dermal Matrix (ADM) (206). The ADM may then be shaped and/or cut into a pre-defined shape, such as the semi-circular tissue portion 102 or another appropriate shape, as necessary for an associated or pre-determined/assigned surgical procedure (208). The shaping may be accomplished using any appropriate scoring tool 130 or another appropriate shaping tool, and the graft may be cut out with the cutting tool.

The ADM may also be meshed/fenestrated in the desired mesh pattern (e.g., 1:1 graft:space ratio, 2:1 graft:space ratio) using any appropriate skin mesher 140 (210). The meshing or fenestrating process (210) may occur before or after the ADM is shaped into the pre-defined shape. The resulting pre-shaped, meshed ADM graft 100 may then be verified for its thickness to specification (e.g., 1 mm-2 mm) (212) using a thickness gauge, and one or more antimicrobial agents may be added to the pre-shaped, meshed ADM graft 100 to aid in post-surgical infection prevention (213). The graft 100 may then be packaged (214) between opposing pieces of backing material 172 within sterile water inside a self-sealing medical sterilization pouch 174 and/or a peelable pouch 176 such as, for example, a Kapak peel-pouch, forming the pre-shaped, meshed ADM graft product 170. The packaged ADM graft product 170 may be irradiated to SAL $10^{-6}$ (216). After irradiation (216), the packaged, pre-shaped, meshed ADM graft product 170 may be stored up to two years (218) before it is used in a surgical procedure (220).

In one embodiment, prior to packaging (214), two of the pre-shaped, meshed ADM grafts 100 may be joined (e.g., sutured) together about a curving portion of each individual graft 100 to form the ADM graft pocket 160 (222), discussed above in relation to FIG. 10. Alternatively, the ADM graft pocket 160 may be formed prior to a surgical procedure, within or prior to entering the operating theater.

The method of manufacturing the packaged, pre-shaped, meshed ADM graft product 170 provides a repeatable process for manufacturing the pre-shaped, meshed ADM graft 100 formed from full-thickness donor-derived skin such that surgeons may rely on the time-saving graft product in reconstructive surgical procedures to provide a graft solution that has the robust physical properties required of surgical skin grafts (as opposed to burn skin grafts), promotes healing in the form of effective drainage from the surgical site, and promotes integration of the graft into the patient's body.

Figure 14:
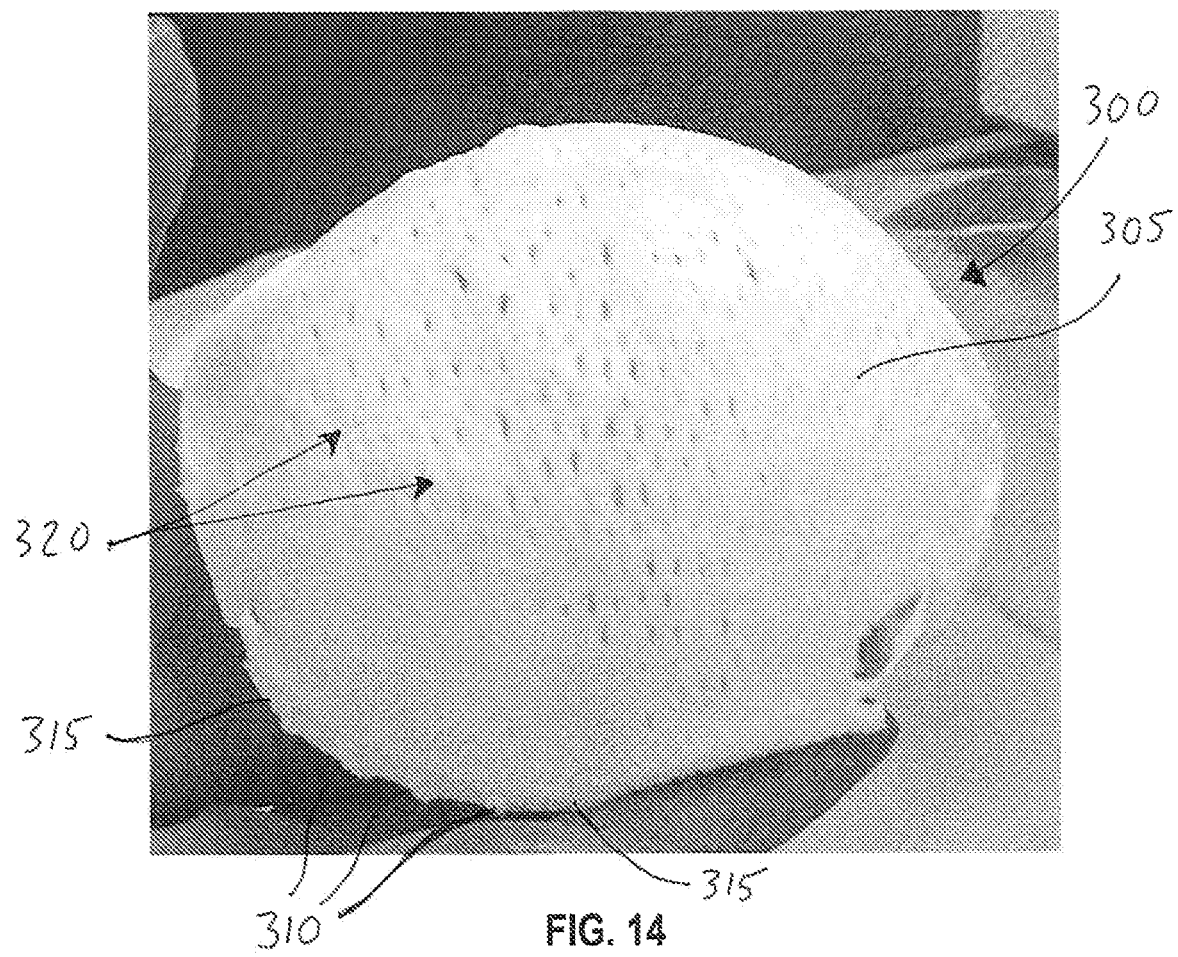
FIG. 14 is a photograph of an embodiment of a domed shaped ADM graft product.
Figure 15A:
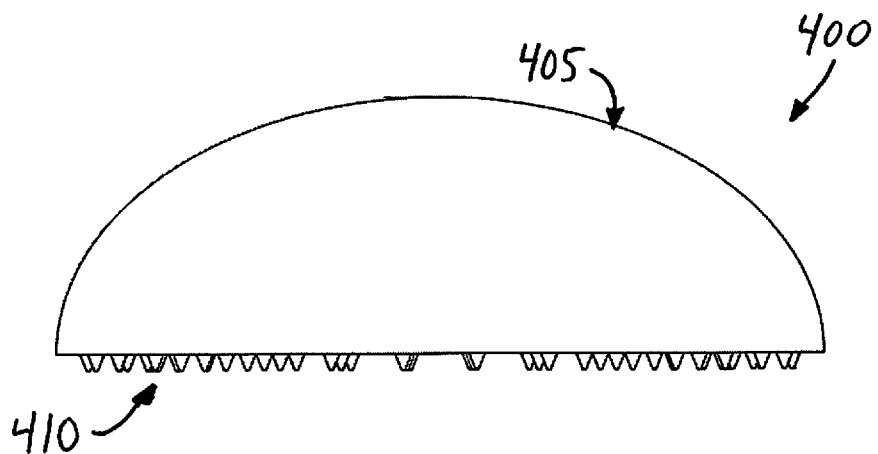
FIGS. 15A and 15B illustrate an embodiment of a shaping and scoring tool for manufacturing of the domed shaped ADM graft product of FIG. 15.
Figure 15B:
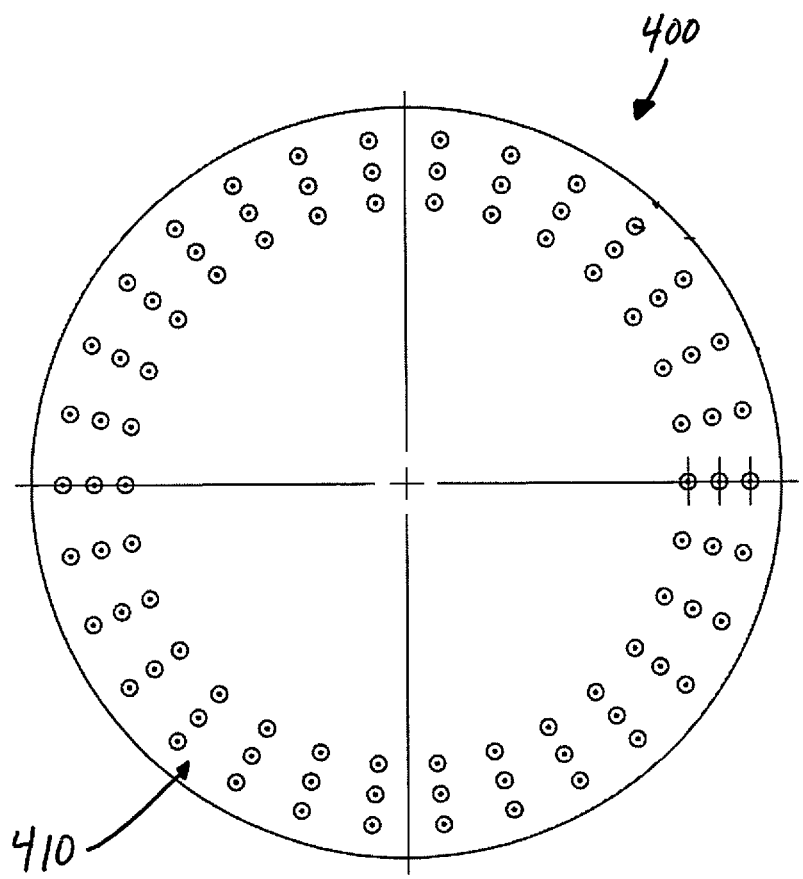
Figure 16:
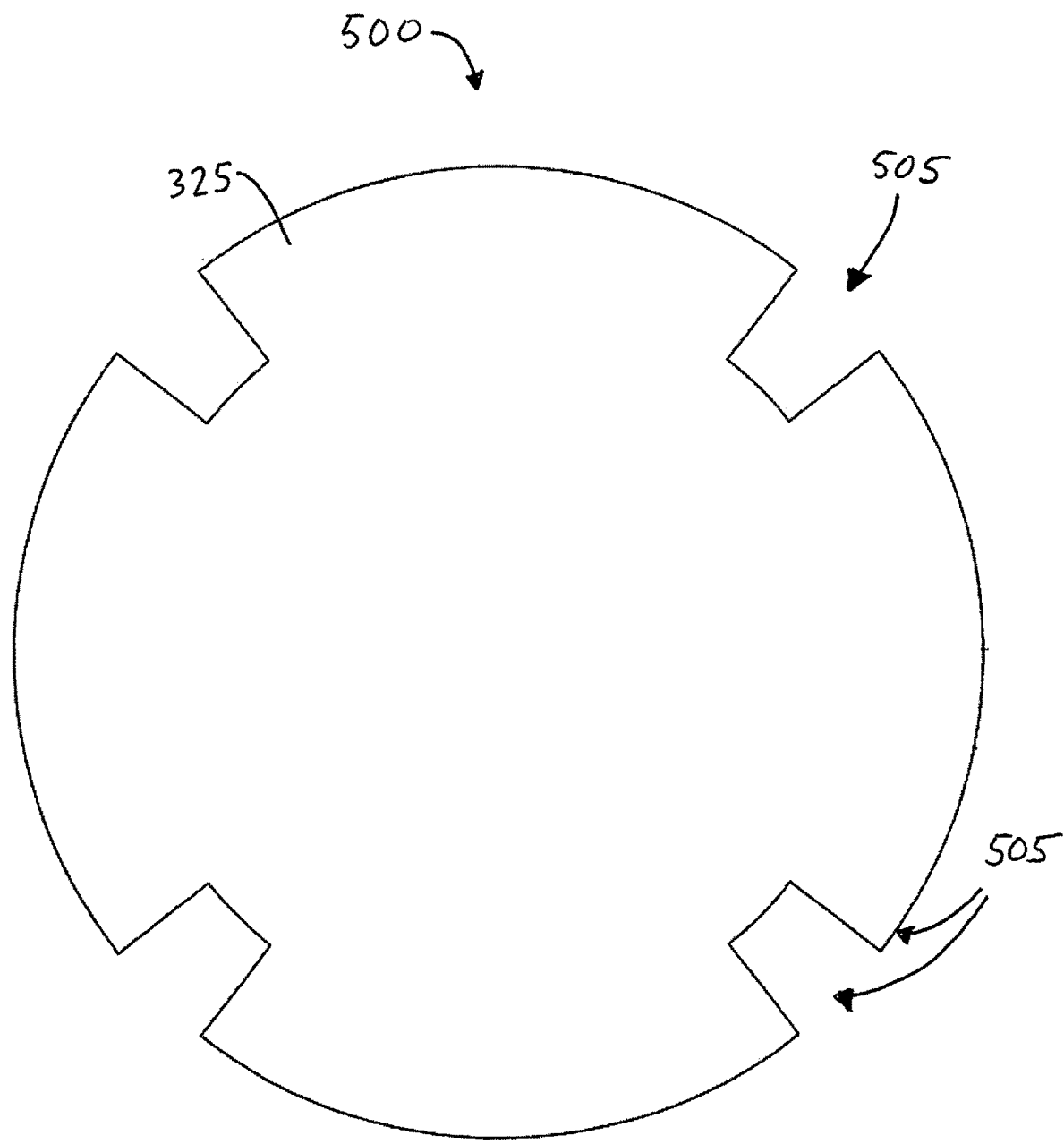
FIG. 16 illustrates an alternative embodiment of a domed shaped ADM graft product having a multi-notched peripheral edge.

In another embodiment, there may be provided a domed shaped ADM graft product 300 (see, for example FIGS. 14 and 16). FIGS. 15A and 15B illustrate an embodiment of a shaping and scoring tool 400 for manufacturing of the domed shaped ADM graft product 300 as illustrated FIG. 15.

The shaping and scoring tool 400 of FIG. 15, or a similar type of device or devices, may be provided with a shaping portion 405 to impart the dome shape 305 to the ADM graft product 300. Furthermore, a scoring portion 410 integrated in the same device 305, or provided separately, is configured to impart a desired mesh pattern 310 (which may be a concentric pattern formed on edges 315 of the ADM graft product 300, or another desired mesh pattern, in addition to mesh patten 320, across an entire surface of the ADM graft 300, or the domed shaped ADM graft 300 may be shaped without a mesh pattern in a specific region or without any mesh pattern across the entire ADM graft 300.)

With reference to FIG. 16, there is shown another embodiment 500 of an initial portion 325 of a domed shaped ADM graft product 300 having a multi-notched peripheral edge 505. This multi-notched embodiment 500 may be one or both of shaped and/or scored using the shaping and scoring tool 400 of FIG. 15 or other suitable apparatus and processing steps.

The decellularized, full-thickness dermal tissue 500 may be shaped and cut into the domed shaped ADM graft 300 using an appropriately designed scoring tool along with a cutting tool such as, for example, a surgical scalpel or a surgical scissor.

The pre-shaped nature of the domed shaped ADM graft disclosed herein saves the surgeon valuable time during a surgical procedure because there is no (or minimal) need for the surgeon to shape, cut, or otherwise form the ADM graft into a desired shape during surgical preparation. Instead, the surgeon may simply select an appropriately pre-shaped ADM graft for the particular surgery and proceed.

Embodiments of domed shaped ADM graft may additionally include a mesh or fenestration pattern to allow for increased fluid flow through the graft, thereby reducing the chances of post-surgical seroma formation, a frequent complication after surgeries using existing ADM grafts. Pre-meshing also prevents the surgeon from having to perform any type or kind of meshing procedures during surgical preparation or during a surgical procedure and ensures an optimal mesh ratio to provide maximum fluid egress, or drainage, from the surgical site to prevent seroma formation and a maximum graft surface area for improved integration into the body post procedure.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method of manufacturing an acellular dermal matrix (ADM) graft product for use in a reconstructive surgical procedure, the method comprising:
   providing a portion of donor-derived skin, the portion of the donor-derived skin having a full thickness;
   removing an epidermis layer and a fat layer from the portion of the donor-derived skin to form a portion of dermal tissue;
   decellularizing the portion of the dermal tissue to form a portion of ADM graft material;
   forming the portion of the ADM graft material into a pre-defined shape in anticipation of the reconstructive surgical procedure, and the forming the portion of the ADM graft material into the pre-defined shape comprises at least one of scoring and cutting the portion of the ADM graft material into a domed shape ADM graft;
verifying that a thickness of the pre-defined shape equals a specified thickness;
shaping the domed shape ADM graft to form an ADM graft pocket configured to receive a breast implant;
packaging the ADM graft pocket to form a packaged ADM graft pocket; and
irradiating the packaged ADM graft pocket to a sterility assurance level of a desired level to form the ADM graft product;
wherein the step of shaping the domed shape ADM graft to form the packaged ADM graft pocket includes suturing together semi-circular tissue portions of the domed shape ADM graft to form a pre-sutured ADM graft pocket.

2. The method of claim 1, further comprising the steps of packaging and irradiating the pre-sutured ADM graft pocket to form a pre-sutured and packaged ADM graft pocket.

3. A method of manufacturing an acellular dermal matrix (ADM) graft product for use in a reconstructive surgical procedure, the method comprising:
providing a portion of donor-derived skin, the portion of the donor-derived skin having a full thickness;
removing an epidermis layer and a fat layer from the portion of the donor-derived skin to form a portion of dermal tissue;
decellularizing the portion of the dermal tissue to form a portion of ADM graft material;
forming the portion of the ADM graft material into a pre-defined shape in anticipation of the reconstructive surgical procedure, and the forming the portion of the ADM graft material into the pre-defined shape comprises at least one of scoring and cutting the portion of the ADM graft material into a domed shape ADM graft;
verifying that a thickness of the pre-defined shape equals a specified thickness;
shaping the domed shape ADM graft to form an ADM graft pocket configured to receive a breast implant;
packaging the ADM graft pocket to form a packaged ADM graft pocket; and
irradiating the packaged ADM graft pocket to a sterility assurance level of a desired level to form the ADM graft product;
wherein the step of shaping the domed shape ADM graft to form the packaged ADM graft pocket includes providing at least a second domed shaped ADM graft, and further includes suturing together the domed shaped ADM graft and the second domed shaped ADM graft to form a pre-sutured ADM graft pocket.

4. The method of claim 3, further comprising the steps of packaging and irradiating the pre-sutured ADM graft pocket to form a pre-sutured and packaged ADM graft pocket.

5. The method of claim 3, wherein the step of suturing includes suturing together around semi-circular tissue portions of the domed shape ADM graft and the second domed shaped ADM graft.

6. The method of claim 5, wherein the step of shaping the domed shape ADM graft to form the ADM graft pocket is configured to size the ADM graft pocket to receive the breast implant with support at a bottom portion of the ADM graft pocket and without covering the breast implant at the top of the ADM graft pocket.

7. The method of claim 1, wherein the step of packaging the ADM graft pocket includes packaging in a medical sterilization pouch to form the packaged ADM graft pocket.

8. The method of claim 1, wherein the step of irradiating the packaged ADM graft pocket to the sterility assurance level includes irradiating to at least the desired level of $10^{-6}$.

9. The method of claim 1, further comprising, prior to the packaging, fenestrating the domed shape into a mesh pattern.

10. An acellular dermal matrix (ADM) graft stored as a packaged ADM graft pocket product prepared by a process comprising the steps of:
providing a portion of ADM tissue having a thickness between 1 mm and 2 mm;
scoring the portion of the ADM tissue into a pre-defined shape to form the domed shape ADM graft;
verifying the thickness of the domed shape ADM graft;
shaping the domed shape ADM graft to form an ADM graft pocket configured to receive a breast implant;
packaging the ADM graft pocket to form a packaged ADM graft pocket; and
irradiating the packaged ADM graft pocket to a sterility assurance level of a desired level to form the packaged ADM graft pocket product;
wherein the step of shaping the domed shape ADM graft to form the packaged ADM graft pocket includes suturing together semi-circular tissue portions of the domed shape ADM graft to form a pre-sutured ADM graft pocket.

11. The ADM graft stored as the packaged graft pocket product prepared by the process of claim 10, further comprising the steps of packaging and irradiating the pre-sutured ADM graft pocket to form a pre-sutured and packaged ADM graft pocket.

12. An acellular dermal matrix (ADM) graft stored as a packaged ADM graft pocket product prepared by a process comprising the steps of:
providing a portion of ADM tissue having a thickness between 1 mm and 2 mm;
scoring the portion of the ADM tissue into a pre-defined shape to form the domed shape ADM graft;
verifying the thickness of the domed shape ADM graft;
shaping the domed shape ADM graft to form an ADM graft pocket configured to receive a breast implant;
packaging the ADM graft pocket to form a packaged ADM graft pocket; and
irradiating the packaged ADM graft pocket to a sterility assurance level of a desired level to form the packaged ADM graft pocket product;
wherein the step of shaping the domed shape ADM graft to form the packaged ADM graft pocket includes providing at least a second domed shaped ADM graft, and further includes suturing together the domed shaped ADM graft and the second domed shaped ADM graft to form a pre-sutured ADM graft pocket.

13. The ADM graft stored as the packaged graft pocket product prepared by the process of claim 12, further comprising the steps of packaging and irradiating the pre-sutured ADM graft pocket to form a pre-sutured and packaged ADM graft pocket.

14. The ADM graft stored as the packaged graft pocket product prepared by the process of claim 10, wherein the step of packaging the ADM graft pocket includes packaging in a medical sterilization pouch to form the packaged ADM graft pocket.

15. The ADM graft stored as the packaged graft pocket product prepared by the process of claim 10, wherein the step of irradiating the packaged ADM graft pocket to the sterility assurance level includes irradiating to at east the desired level of $10^{-6}$.

16. The ADM graft stored as the packaged graft pocket product prepared by the process of claim 10, further comprising, prior to the packaging, fenestrating the domed shape into a mesh pattern.

17. The method of claim 1, wherein the step of packaging the ADM graft pocket includes packaging in a medical sterilization pouch to form the packaged ADM graft pocket.

18. The method of claim 1, wherein the step of irradiating the packaged ADM graft pocket to the sterility assurance level includes irradiating to at least the desired level of $10^{-6}$.

19. The method of claim 1, further comprising, prior to the packaging, fenestrating the domed shape into a mesh pattern.

* * * * *